United States Patent

[11] 3,582,925

| [72] | Inventor | Lester H. Porter, Jr.<br>Dallas, Tex. |
|---|---|---|
| [21] | Appl. No. | 662,268 |
| [22] | Filed | Aug. 8, 1967 |
| [45] | Patented | June 1, 1971 |
| [73] | Assignee | Beta Corporation<br>Dallas, Tex.<br>Continuation-in-part of application Ser. No. 588,847, Oct. 24, 1966, now abandoned. |

[54] INDICATOR MODULES FOR ANNUNCIATOR SYSTEMS
9 Claims, 24 Drawing Figs.

[52] U.S. Cl. .................................................. 340/213.1,
317/101, 340/415
[51] Int. Cl. ......................................................... G08b 29/00
[50] Field of Search ........................................... 340/415,
412, 213, 413, 414, 213.1

[56] References Cited
UNITED STATES PATENTS

| 3,029,421 | 4/1962 | Beguin ........................ | 340/415 |
| 3,484,770 | 12/1969 | Cheeseman .................. | 340/415 |
| 3,193,814 | 7/1965 | Foster ......................... | 340/415 |

FOREIGN PATENTS

| 1,238,411 | 7/1960 | France ........................ | 340/415 |

Primary Examiner—Thomas B. Habecker
Attorneys—Giles C. Clegg, Jr. and John G. Graham ABSTRACT: This application discloses annunciator systems for monitoring operation of processes and equipment and indicating and occurrence of abnormal conditions, these systems using an indicator module which is adaptable for a wide variety of types of indicator sequences including first-out, latching or nonlatching, ringback, sequence readout, and others. The indicator module comprises a combination including gates and bistable devices to provide these functions.

INVENTOR
LESTER H. PORTER JR.

BY
ATTORNEYS

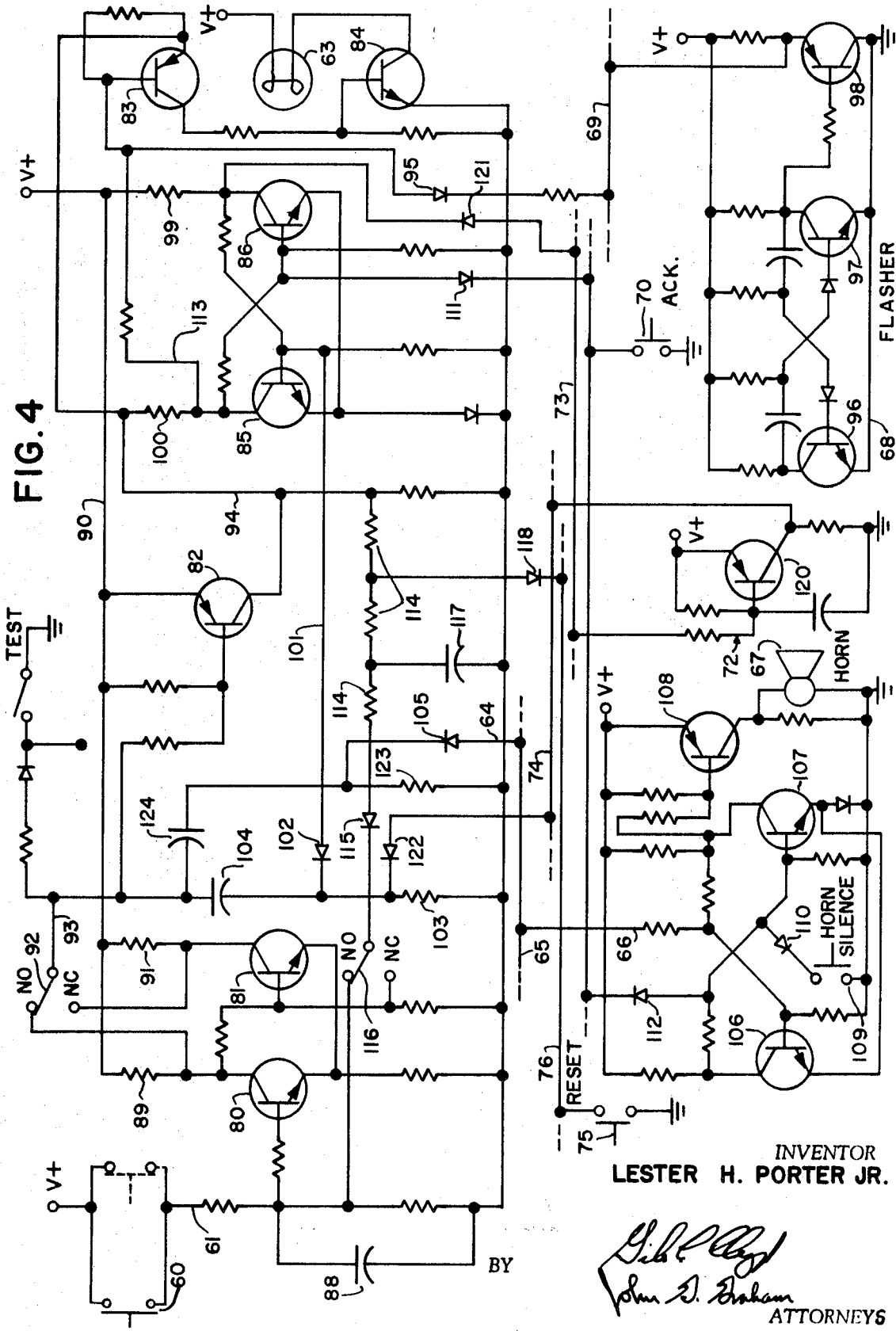

INVENTOR
LESTER H. PORTER JR.

ATTORNEYS

INVENTOR
LESTER H. PORTER JR.

INVENTOR
LESTER H. PORTER JR.

ATTORNEY

INVENTOR
LESTER H. PORTER JR.

ATTORNEY

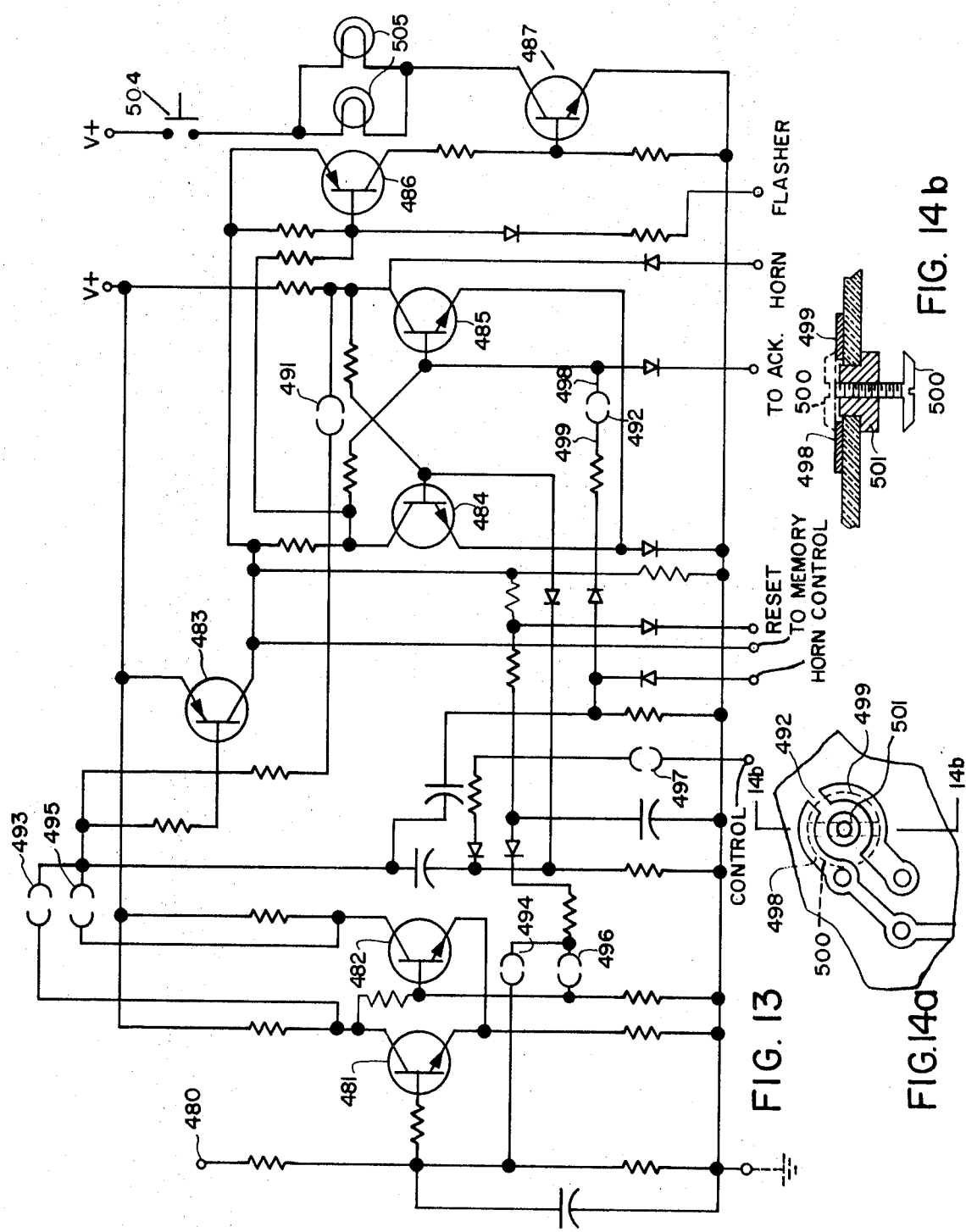

SEQUENCE FOR MODULE OF FIGS. 1 & 2

|  | FIELD CONTACTS NORMAL | FIELD CONTACTS OFF-NORMAL | F-C RET. TO NORMAL BEFORE ACK. | ACKNOW. BEFORE F-C RET. TO NORM. | F-C RET TO NORM. AFTER ACK. | ACKNOWLED AFTER F-C RETURN TO NORMAL |
|---|---|---|---|---|---|---|
| 1ST POINT-LAMP | OFF | ON FLASHING | ON FLASHING | ON STEADY | ON FLASHING | OFF |
| 2ND POINT-LAMP | OFF | ON FLASHING | ON FLASHING | ON STEADY | ON FLASHING | OFF |
| AUDIBLE | OFF | ON | ON | OFF | ON | OFF |

FIG. 15

SEQUENCE FOR MODULE OF FIGS. 3 & 4

|  | FIELD CONTACT NORMAL | 1ST F-C OFF NORMAL | 1ST F-C RET. TO NORMAL BEFORE ACK. | ACK. BEFORE OR AFTER 1ST F-C RETURN TO NORMAL | 1ST F-C RETURN TO NORMAL AFTER ACK. | 2ND F-C OFF NORMAL BEFORE ACK. | 2ND F-C RET. TO NORMAL BEFORE OR AFTER ACK. | RESET |
|---|---|---|---|---|---|---|---|---|
| 1ST POINT-LAMP | OFF | ON FLASH | ON FLASH | ON STEADY | ON STEADY | ON FLASH | — | OFF |
| 2ND POINT-LAMP | OFF | OFF | OFF | OFF | OFF | ON STEADY | ON STEADY | OFF |
| AUDIBLE | OFF | ON | ON | OFF | OFF | ON | ON/OFF | OFF |

FIG. 16

SEQUENCE FOR MODULE OF FIGS. 5 & 6

|  | FIELD CONTACT NORMAL | FIELD CONTACT OFF NORMAL | HORN SILENCE | F-C RETURN TO NORMAL BEFORE ACK. | ACK. BEFORE OR AFTER RETURN TO NORMAL | RETURN TO NORMAL AFTER ACK. | RESET | TEST |
|---|---|---|---|---|---|---|---|---|
| FIRST 7 OUT-LAMPS | OFF | ON FLASH | ON FLASH | ON FLASH | ON STEADY | ON STEADY | OFF | ON FLASH |
| SUBSEQUENT OUT | OFF | ON STEADY | ON STEADY | ON STEADY | ON STEADY | ON STEADY | OFF | ON FLASH |
| AUDIBLE | OFF | OFF | OFF | ON/OFF | OFF | OFF | OFF | ON |

FIG. 17

INVENTOR
LESTER H. PORTER JR.
ATTORNEY

PATENTED JUN 1 1971

SEQUENCE FOR MODULE OF FIGS. 7 & 8

|  | FIELD CONTACT NORMAL | 1ST POINT F-C OFF NORMAL | 2ND POINT F-C OFF NORMAL | 1ST F-C RETURN TO NORMAL BEFORE ACK. | 2ND F-C RETURN TO NORMAL BEFORE ACK. | ACK. BEFORE F-C RETURN TO NORMAL | ACK. AFTER F-C RETURN TO NORMAL | 1ST F-C RETURN TO NORMAL AFTER ACK. | 2ND F-C RETURN TO NORMAL AFTER ACK. | — NEXT SET-AFTER ACKNOWLEDGE — | | | RESET |
|---|---|---|---|---|---|---|---|---|---|---|---|---|---|
|  |  |  |  |  |  |  |  |  |  | 1ST F-C OFF NORMAL | 2ND F-C OFF NORMAL | 1ST & 2ND F-C RETURN TO NORMAL BEFORE ACK. | ACK. BEFORE RETURN TO NORMAL | RETURN TO NORMAL AFTER ACK. |
| 1ST POINT-LAMP | OFF | FLASHING RED | FLASH'G RED | FLASH'G RED | FLASH'G RED | STEADY RED | STEADY RED | STEADY RED | STEADY RED | STEADY RED | STEADY RED | STEADY RED | STEADY RED | STEADY RED | OFF |
| 2ND POINT-LAMP | OFF | OFF | FLASH'G WHITE | FLASH WHITE | OFF | STEADY WHITE | OFF | STEADY WHITE | OFF | STEADY WHITE | STEADY WHITE | — | STEADY WHITE | — | OFF |
| AUDIBLE | OFF | ON | ON | ON | ON | OFF | OFF | OFF | OFF | ON | ON | ON | OFF | OFF | OFF |
| NEXT 1ST POINT LAMP | — | — | — | — | — | — | — | — | — | FLASH WHITE | OFF | FLASH WHITE | STEADY WHITE | OFF | OFF |
| 2ND POINT LAMP | — | — | — | — | — | — | — | — | — | OFF | FLASH WHITE | FLASH WHITE | STEADY WHITE | OFF | OFF |

FIG. 18

SEQUENCE FOR MODULE OF FIGS. 9 & 10

|  | FIELD CONTACT NORMAL | FIELD CONTACT OFF NORMAL | F-C RETURN TO NORMAL BEFORE ACK. | ACK. BEFORE F-C RETURN TO NORMAL | F-C RETURN TO NORMAL AFTER ACK. | F-C GO OFF NORMAL AGAIN BEFORE SECOND ACK. | ACK. AFTER F-C RETURN TO NORMAL |
|---|---|---|---|---|---|---|---|
| 1ST POINT-LAMP | OFF | FLASH SLOW | FLASH FAST | ON STEADY | FLASH FAST | FLASH SLOW | OFF |
| 2ND POINT-LAMP | OFF | FLASH SLOW | FLASH FAST | ON STEADY | FLASH FAST | FLASH SLOW | OFF |
| AUDIBLE | OFF | ON TONE 1 | ON TONE 1,2 | OFF | ON TONE 1,2 | ON TONE 2 | OFF BOTH |

FIG. 19

INVENTOR
LESTER H. PORTER JR.

BY *(signature)*

ATTORNEY

FIG. 20

SEQUENCE FOR MODULE OF FIGS. 11 & 12

|  | FIELD CONT. NORM. | 1ST POINT F-C OFF NORM. | 2ND POINT F-C OFF NORM. | 1ST F-C RET. TO NORM. BEFORE ACK. | 2ND F-C RET. TO NORM. BEFORE ACK. | ACK. BEFORE F-C RET. TO NORM. | ACK. AFTER F-C RET. TO NORM. | F-C RET. TO NORM. AFTER ACK. | 1ST F-C OFF NORM. | 2ND F-C OFF NORM. | F-C RET. TO NORM. BEFORE ACK. | ACK. BEFORE F-C RET. TO NORM. | ACK. AFTER F-C RET. TO NORM. | F-O ACK BEFORE F-C RET. TO NORM. |
|---|---|---|---|---|---|---|---|---|---|---|---|---|---|---|
| 1ST POINT-LAMP | OFF | F.R. | F.R. | F.R. | F.R. | S.R. | S.R. OFF | OFF | S.R. | S.R. | S.R. | S.R. | S.R. OFF | S.R. OFF |
| 2ND POINT-LAMP | OFF | OFF | F.W. | F.W. | F.W. | S.W. | S.W. OFF | OFF | S.W. | S.W. | S.W. | S.W. | S.W. OFF | S.W. OFF |
| AUDIBLE | OFF | ON | ON | ON | ON | OFF | OFF | OFF | ON | ON | ON | OFF | OFF | ON/OFF |
| NEXT SET 1ST POINT LAMP | OFF | | | | | | | | F.R. | F.R. | F.R. | S.R. | S.R. | S.R. OFF |
| NEXT SET 2ND POINT LAMP | OFF | | | | | | | | OFF | F.W. | F.W. | S.W. | S.W. | S.W. OFF |

(Columns 9–14 are under the span "NEXT SET - AFTER ACKNOWLEDGE")

KEY:
F-C FIELD CONTACTS
ACK. ACKNOWLEDGE
F.R. FLASHING RED
F.W. FLASHING WHITE
S.R. STEADY RED
S.W. STEADY WHITE
RET. RETURN

INVENTOR
LESTER H. PORTER JR.
BY
ATTORNEY

INDICATOR MODULES FOR ANNUNCIATOR SYSTEMS

This application is a continuation-in-part of my copending application Ser. No. 588,847, filed Oct. 24, 1966 and assigned to the assignee of the present application now abandoned.

The processes and systems used in operations such as utility plants, chemical processing plants, pump stations, and the like, are often monitored and controlled from a central control console which would usually be remote from most of the equipment or stations being monitored. The central control console commonly employs an annunciator system which is connected to selected stations for monitoring the operation of the process or equipment. In the event of a malfunction or abnormal condition at any of the monitored stations, a visual and audible signal device is energized for advising the operator of the presence of the malfunction. Depending upon the complexity of the system being monitored and other factors, a wide variety of such visual and audible signals may be needed in the annunciator system. For example, a "first-out" system may be appropriate, wherein the first station to indicate an abnormal condition produces a flashing light and horn indication, while subsequent malfunctions merely produce a continuous light indication. Also, in some systems it may be desirable to produce an audible and visual signal when the station which previously indicated a malfunction returns to normal. Further, it may be helpful to register the sequence in which the first several stations indicated malfunction to aid the operator in tracing the character of the shutdown in order to initiate corrective action. In some cases it is necessary to provide a distinct indication for stations returning to normal after being abnormal, or to provide an indication of which stations have been acknowledged and which have not while preserving the "first-out" indication. Annunciator systems have not been available which provide this wide variety of modes of operation.

It is the principal object of this invention to provide an indicator module for an annunciator system adapted for monitoring the operation of a large number of stations and for producing a wide variety of possible indications.

In accordance with this invention, several types of indicator modules are provided for use in annunciator systems of the type which utilize a large number of indicator units each of which is responsive to a malfunction condition in a different piece of monitored equipment. These indicator modules may function to produce a visual indication such as a flashing light and an audible indication such as a horn upon the occurrence of a malfunction. The indication may be switched from one type to another, i.e., from a flashing light to a continuous light, and the horn deenergized, after the operator has acknowledged. Also, the type of indication may be different for malfunctions occurring early in the sequence as distinguished from later in the shutdown sequence. Generally the indicator module of this invention utilizes a trigger device which is adapted to produce a first output when the abnormal condition has not occurred and a second output after the abnormal condition is detected, the trigger means including provision for switching between normally open and normally closed field contacts. The trigger device drives a gating device which is adapted to produce an output at a first level when the first output exists from the trigger device and to produce an output at a second level when the second output exists. The output from the gating arrangement is applied to a bistable circuit and is also used to provide one input to another gate in a lamp driver circuit. The bistable circuit is a two stage circuit wherein neither of the stages is conductive when the first level exists from the gate output, but is switched to a first stable state when the second level is produced. A lamp is coupled to a lamp driver which is driven by the second gate in a manner such that the lamp cannot be actuated when the output of the first gate is at the first level, but may be actuated in a flashing mode or a continuous mode when the second level exists. A multivibrator applies a square wave to the second gate to provide the flashing mode, while the output of the bistable circuit is coupled to the gating means to override the square wave and to produce the continuous mode when the bistable circuit is in its second stable state. An audible signal device such as a horn is connected to the indicator module in a manner such that it may be actuated when the bistable circuit is in its first stable state and silent when the bistable circuit is in its second stable state or when neither of the stages is conductive. Alternatively, the horn may be actuated by means of another bistable circuit which is switched at the time when the trigger device switches from its first to its second output. An acknowledge device such as a pushbutton is connected to the bistable circuit to switch it from the first to the second state which of course allows the operator at the control console to change the indication from flashing to continuous and to turn off the horn. Alternatively, the horn may be silenced by switching its separate bistable circuit, allowing the light to continue flashing. The output of the trigger device is differentiated and coupled to the bistable circuit to cause it to assume its first state when the trigger means switches. Also the differentiated output of the trigger may be further coupled to the bistable circuit to cause it to assume the second state when the trigger switches from the second to the first output, i.e., when the malfunction condition ceases. A latching arrangement is provided in one of at least two different alternatives. The output of one stage of the bistable device may be coupled back to the first gate device to hold the first gate output as its second level. Alternatively the output of the first gate may be coupled back to the input of the trigger device to hold its output at the second condition until acknowledged or reset even though the field contacts no longer detect an abnormal condition. The indicator module of this invention may be operated in the first-out mode by detecting the switching of the first one of the modules and generating a signal to disenable the bistable circuits in remainder of the modules from switching to the first stable state. Also the indicator module of this invention may be used in a sequencing type annunciator system since outputs are available from the circuit which may be used as count pulses and the circuit may be disenabled by a lockout arrangement.

In one embodiment of the invention, two different color lamps may be used, the first-out being one color and subsequent outs being another color. The lamps may be flashing before and steady after acknowledge, and the original first-out information preserved after acknowledge by the color distinction. This system is provided by adding another bistable circuit and further lamp gating circuitry in each module as will be explained in detail.

The indicator module of the invention may be modified to provide "ringback" operation wherein modules detecting a return to normal produce a distinct audible and visual indication. This involves adding a further gating circuitry and two different types of flashing modes as well as two types of audible alarms.

It will thus be seen that the indicator module of this invention provides wide variety of different types of operations as may be desirable in an annunciator system.

The novel features believed characteristic of this invention are set forth in the appended claims. The invention itself, however, as well as further objects and advantages thereof, will best be understood by reference to the following detailed description of particular embodiments, when read in conjunction with the accompanying drawings, wherein:

3

Figure 1:
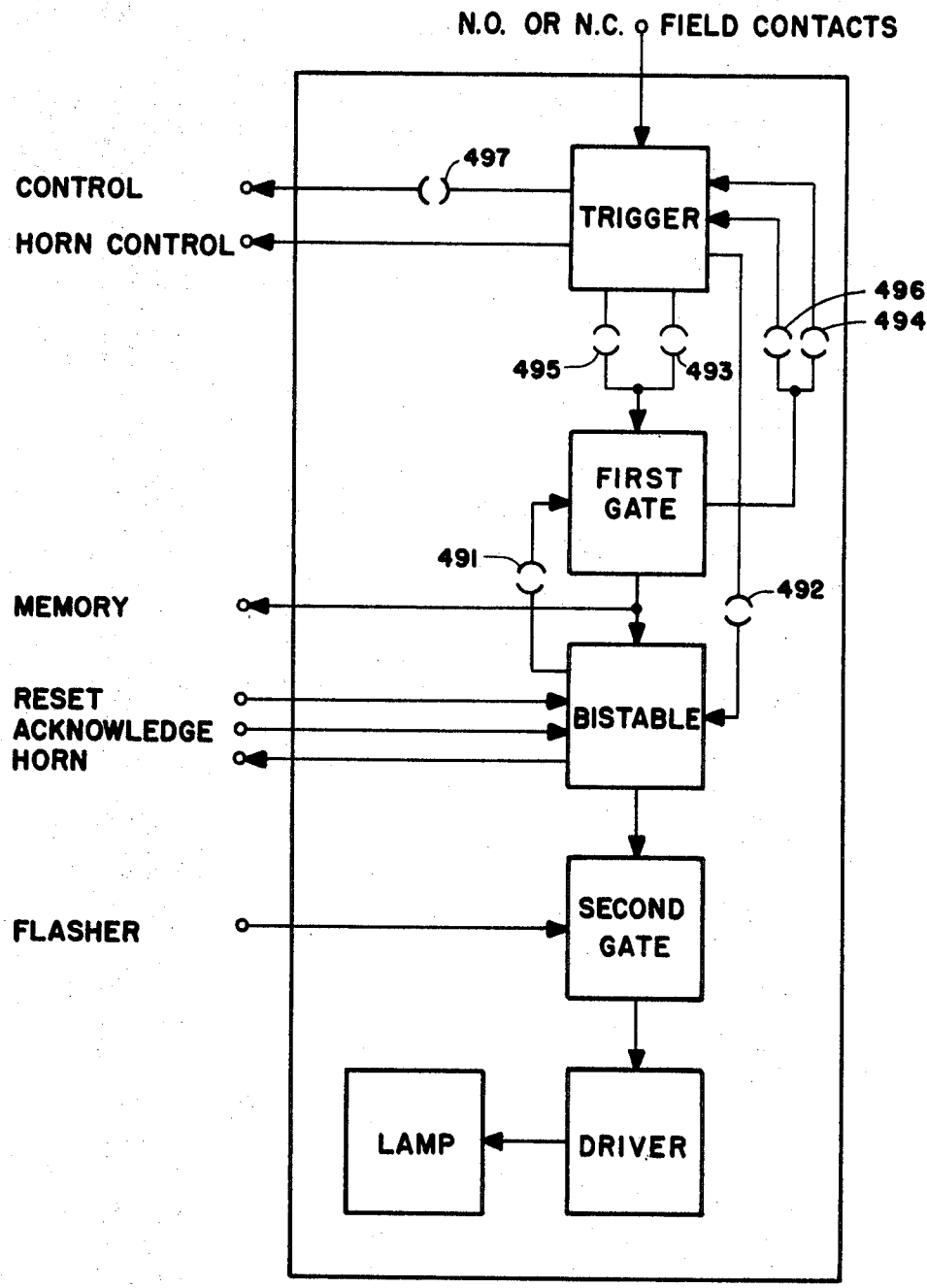
FIG. 1 is a block diagram of an indicator module for an annunciator system utilizing a plurality of selector means selectively connectable to provide one of a plurality of annunciator operating modes.
Figure 1A:
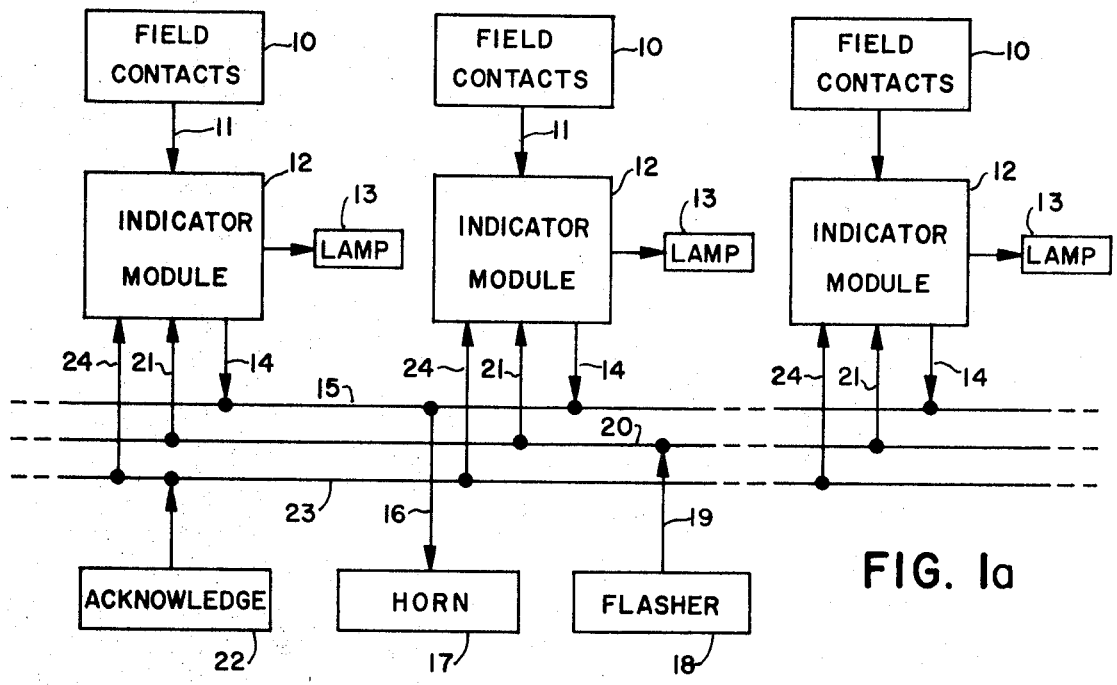
FIG. 1a is a block diagram of an annunciator system utilizing one embodiment of the indicator module of this invention.
Figure 3:
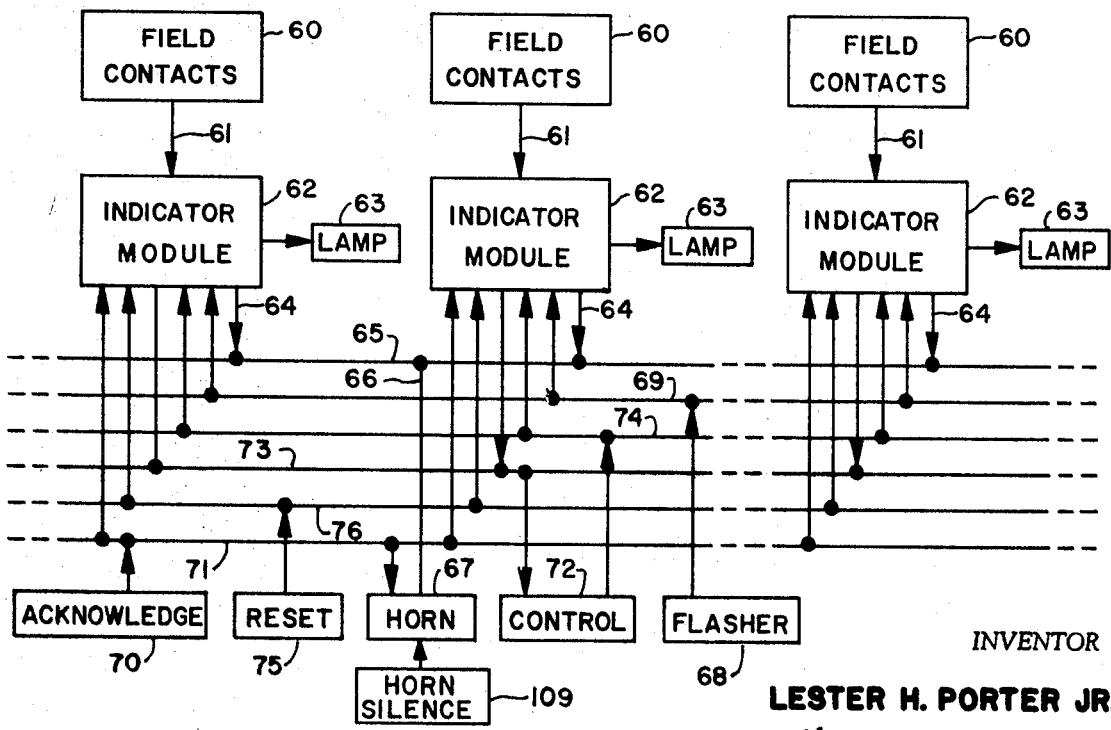
FIG. 3 is a block diagram of an annunciator system utilizing the indicator module of another embodiment of this invention.
Figure 2:
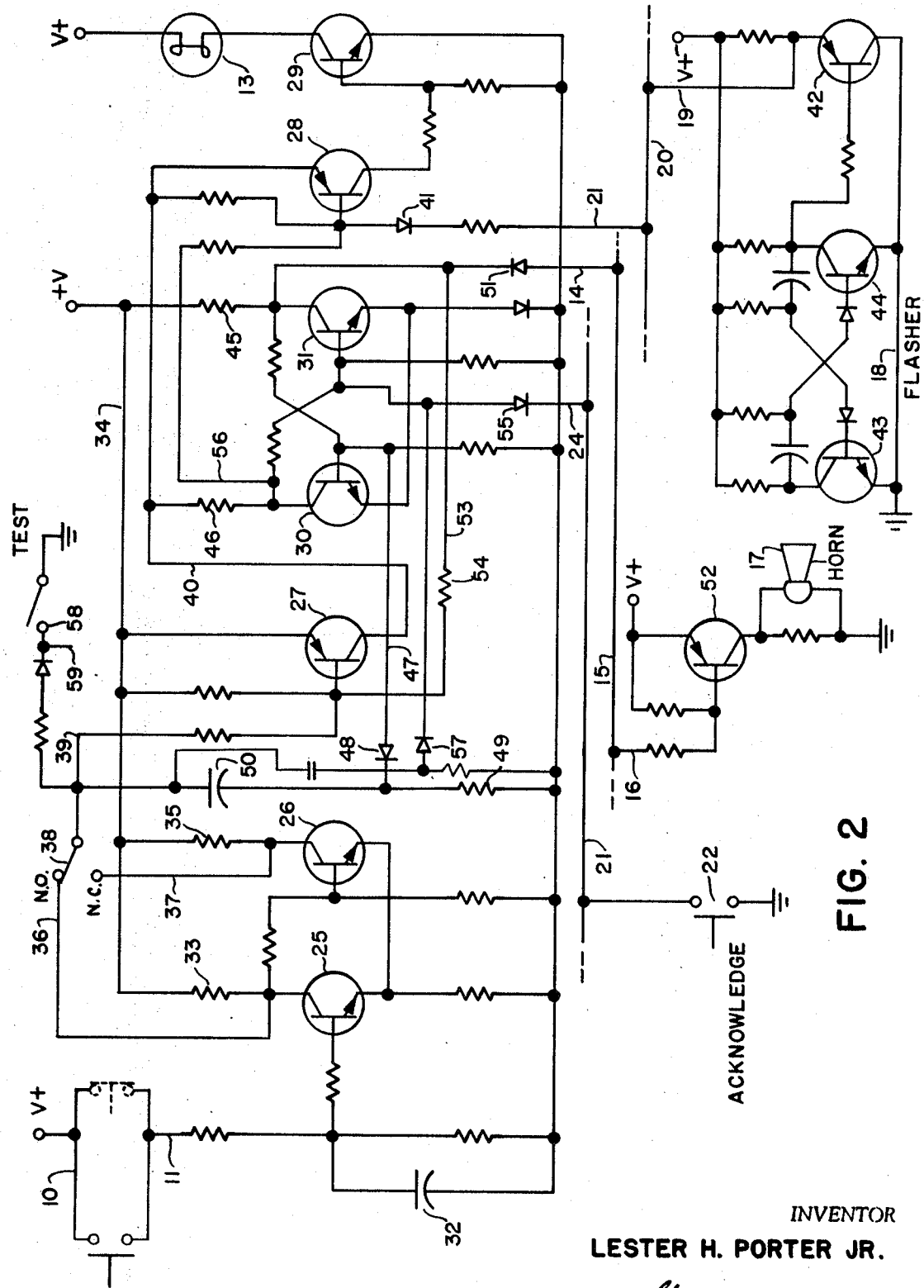
FIG. 2 is a detailed schematic diagram of the annunciator system of FIG. 1 showing the indicator module of one embodiment of the invention.
Figure 5:
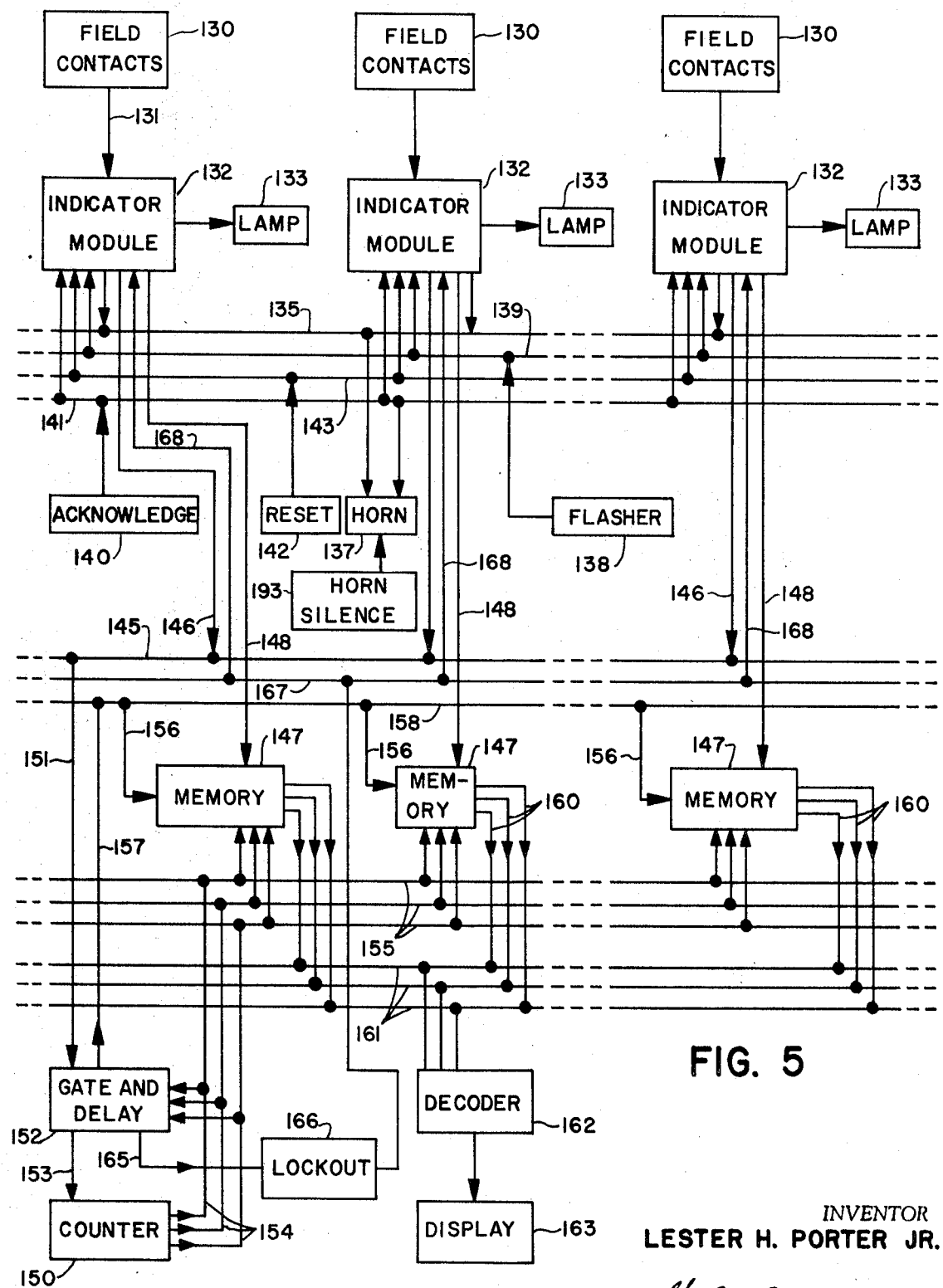
Figure 6:
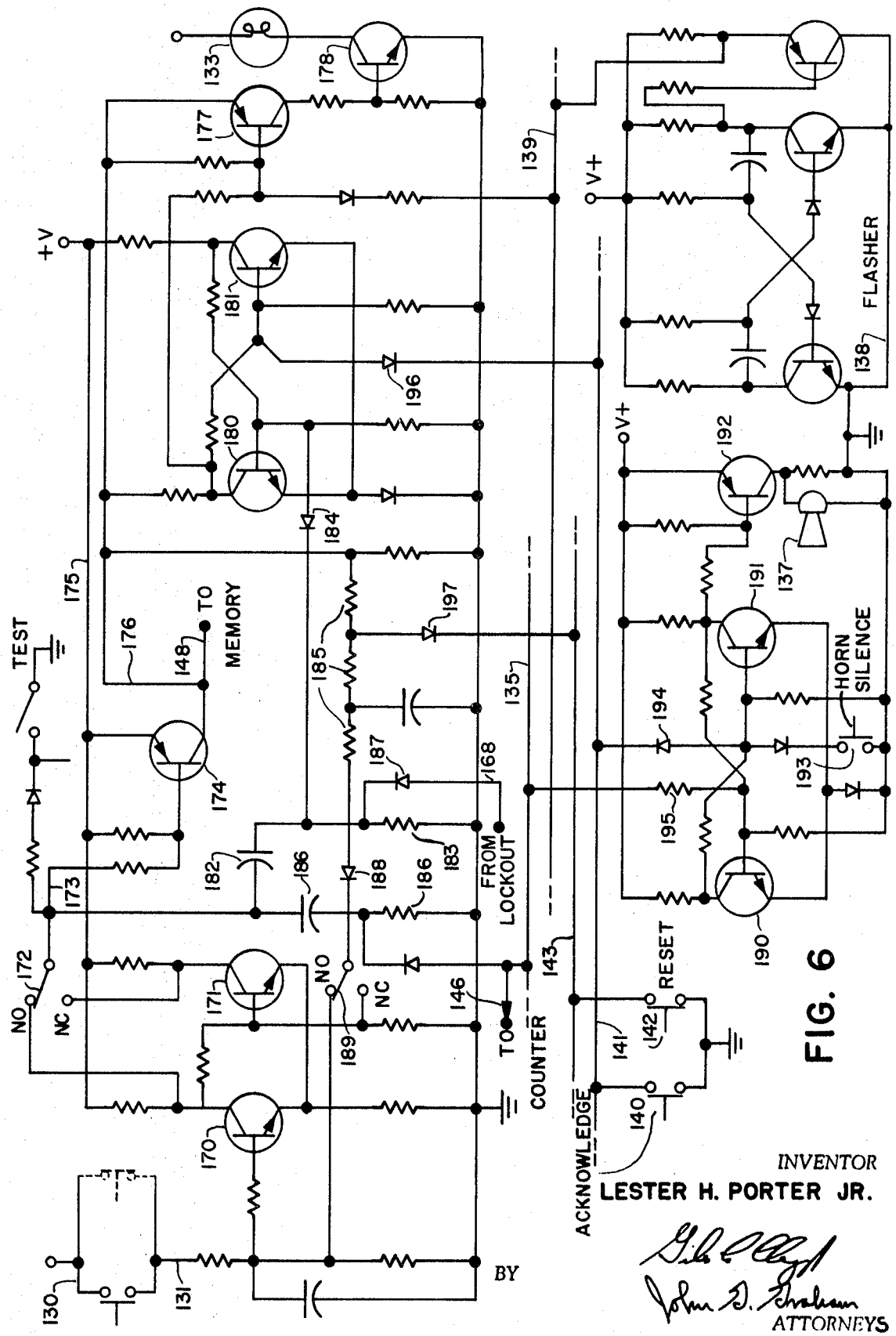
Figure 7:
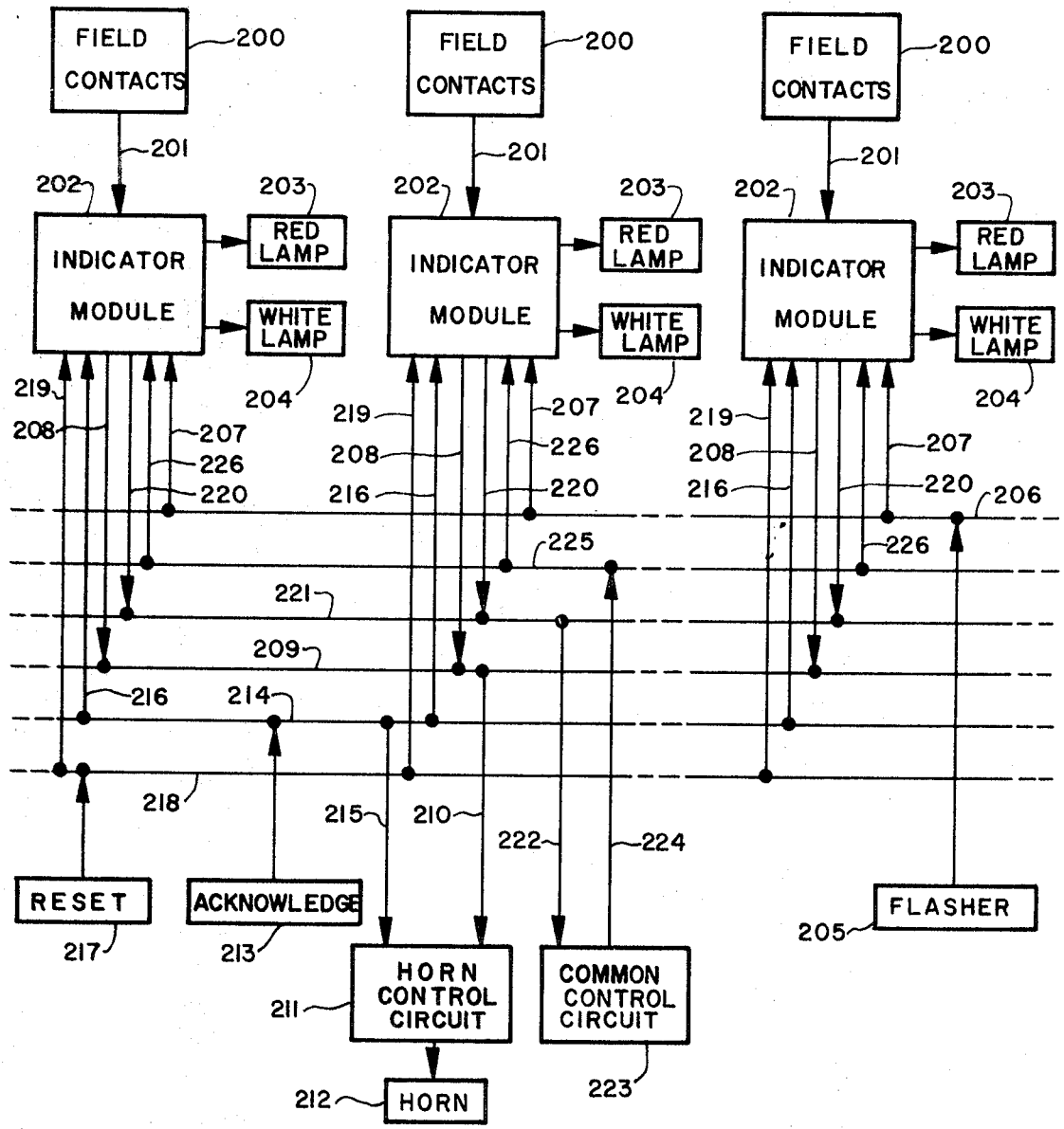
Figure 8A:
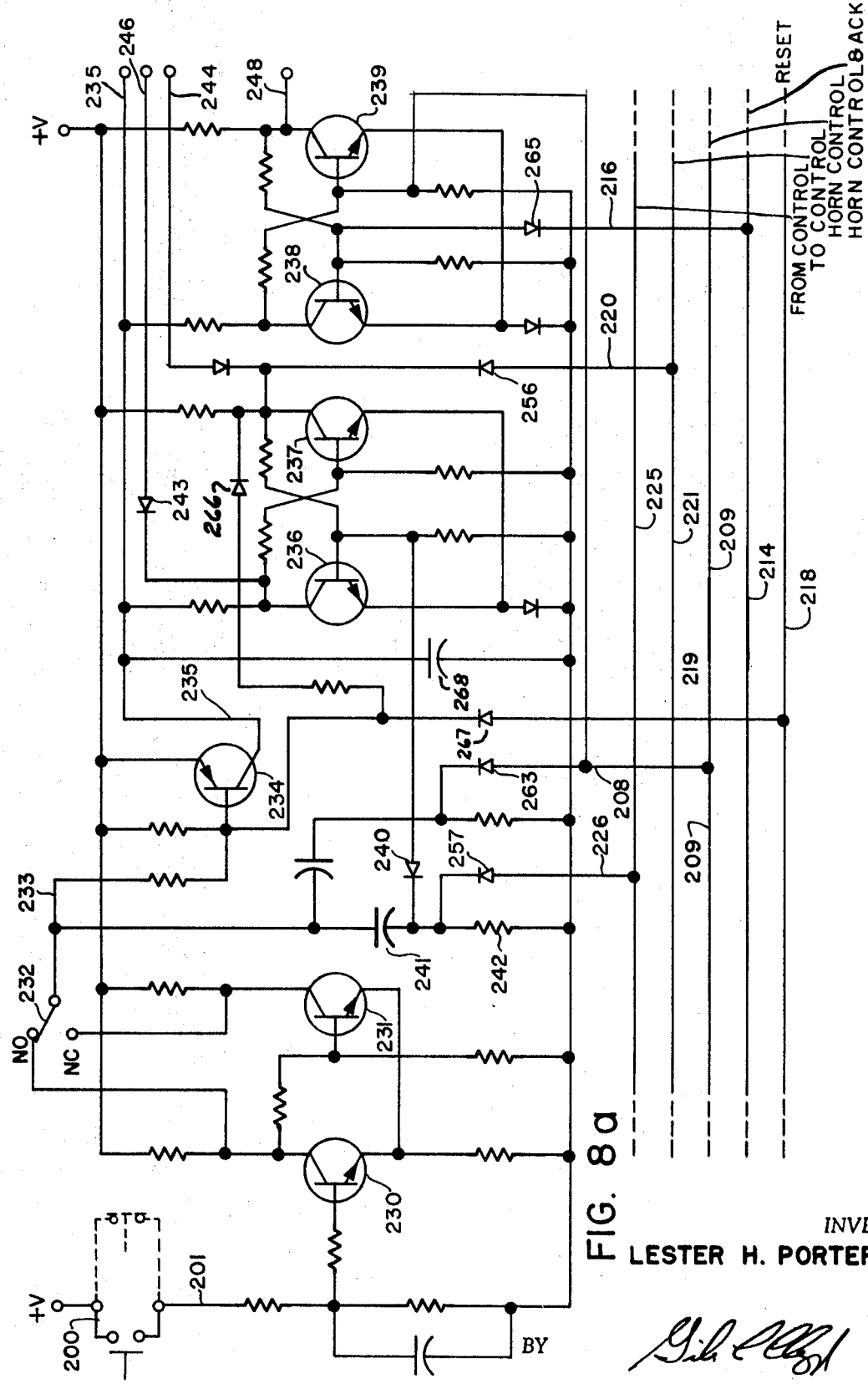
Figure 8B:
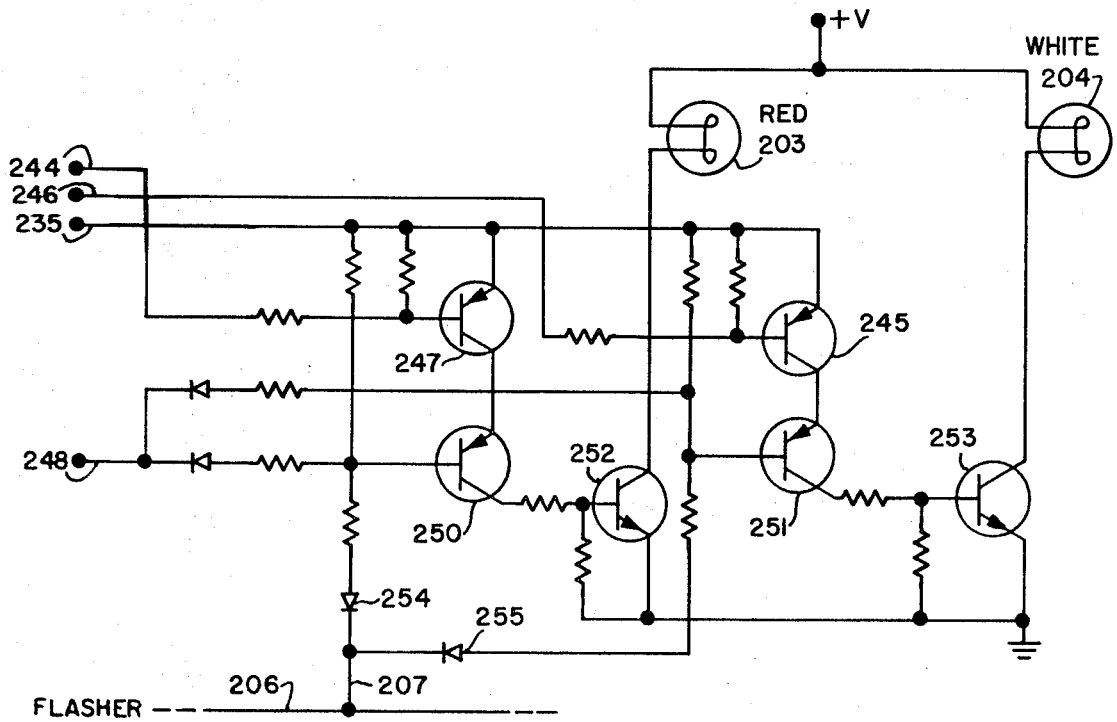
Figure 8C:
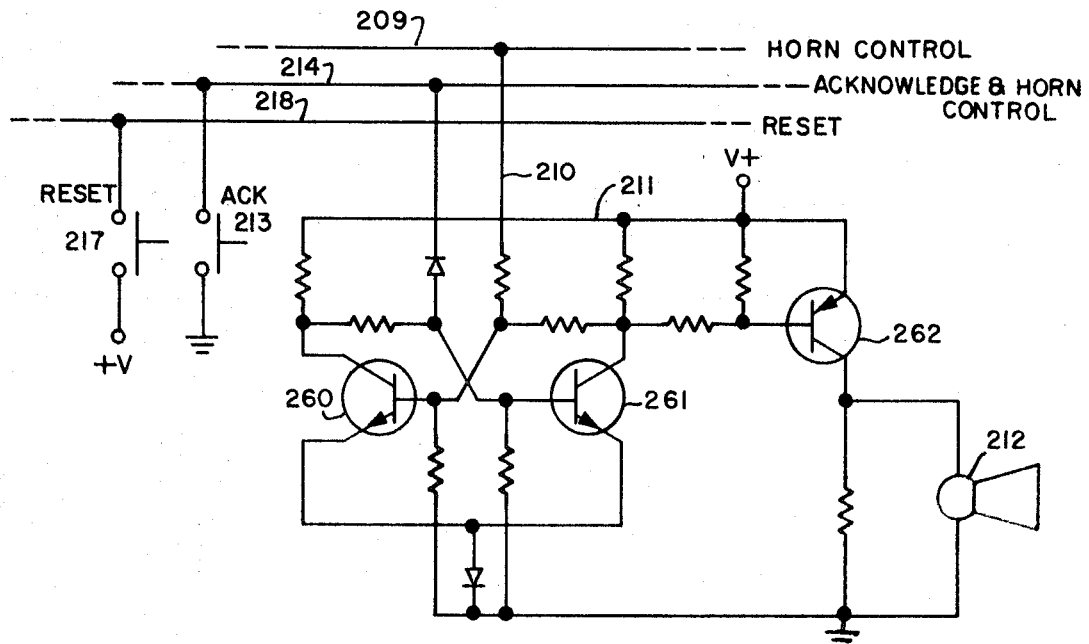
Figure 9:
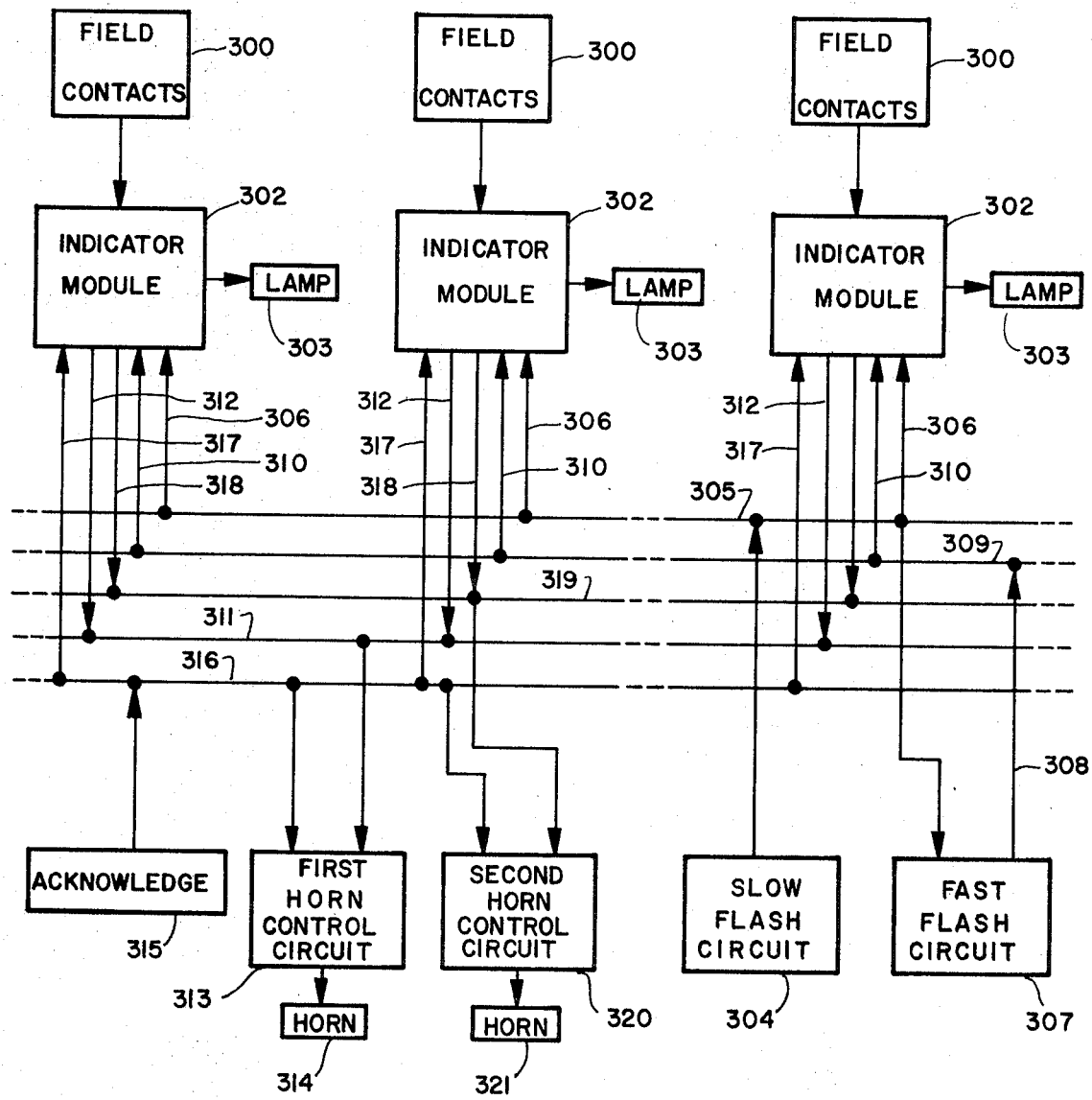
Figure 10:
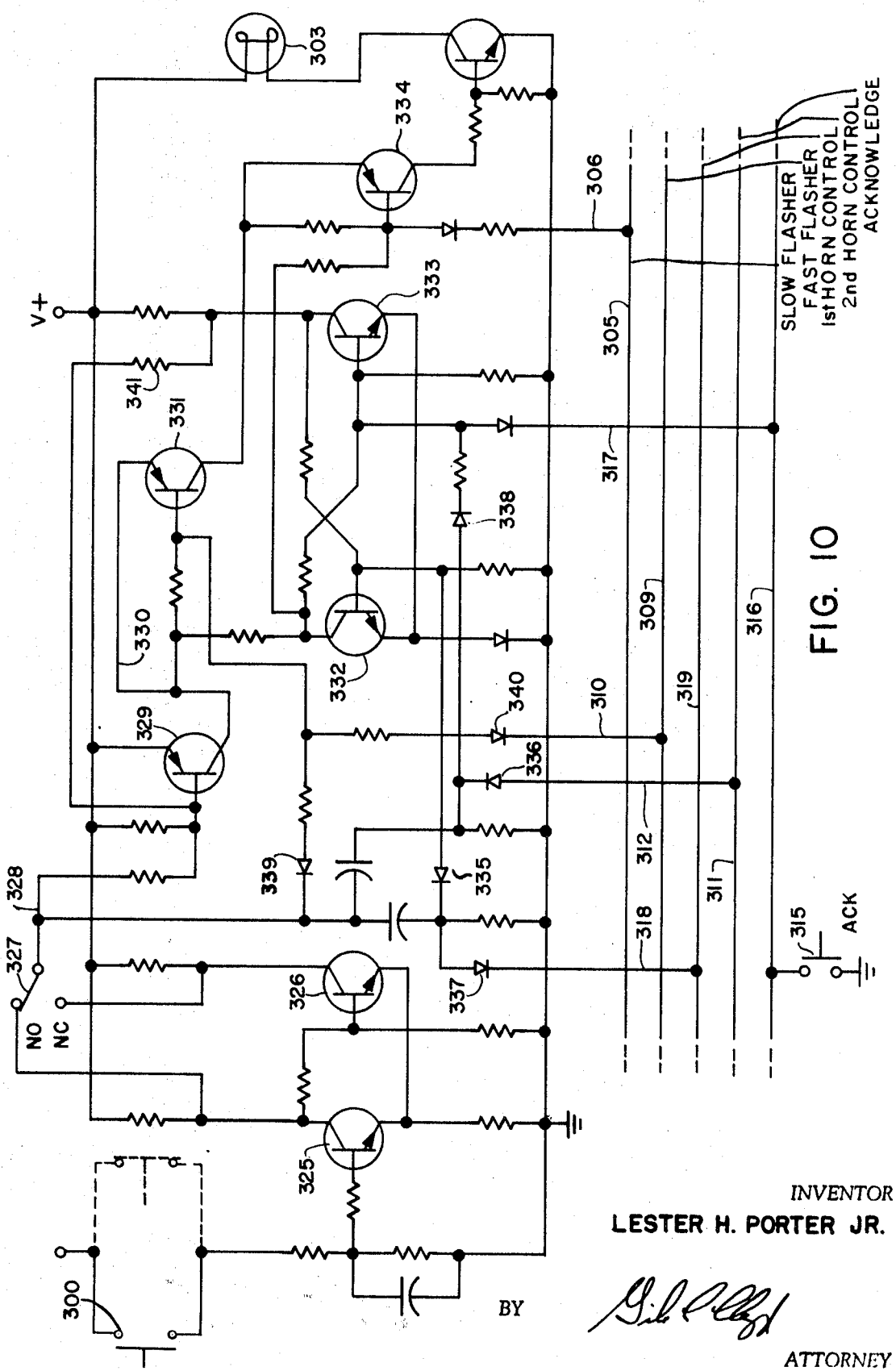
Figure 11:
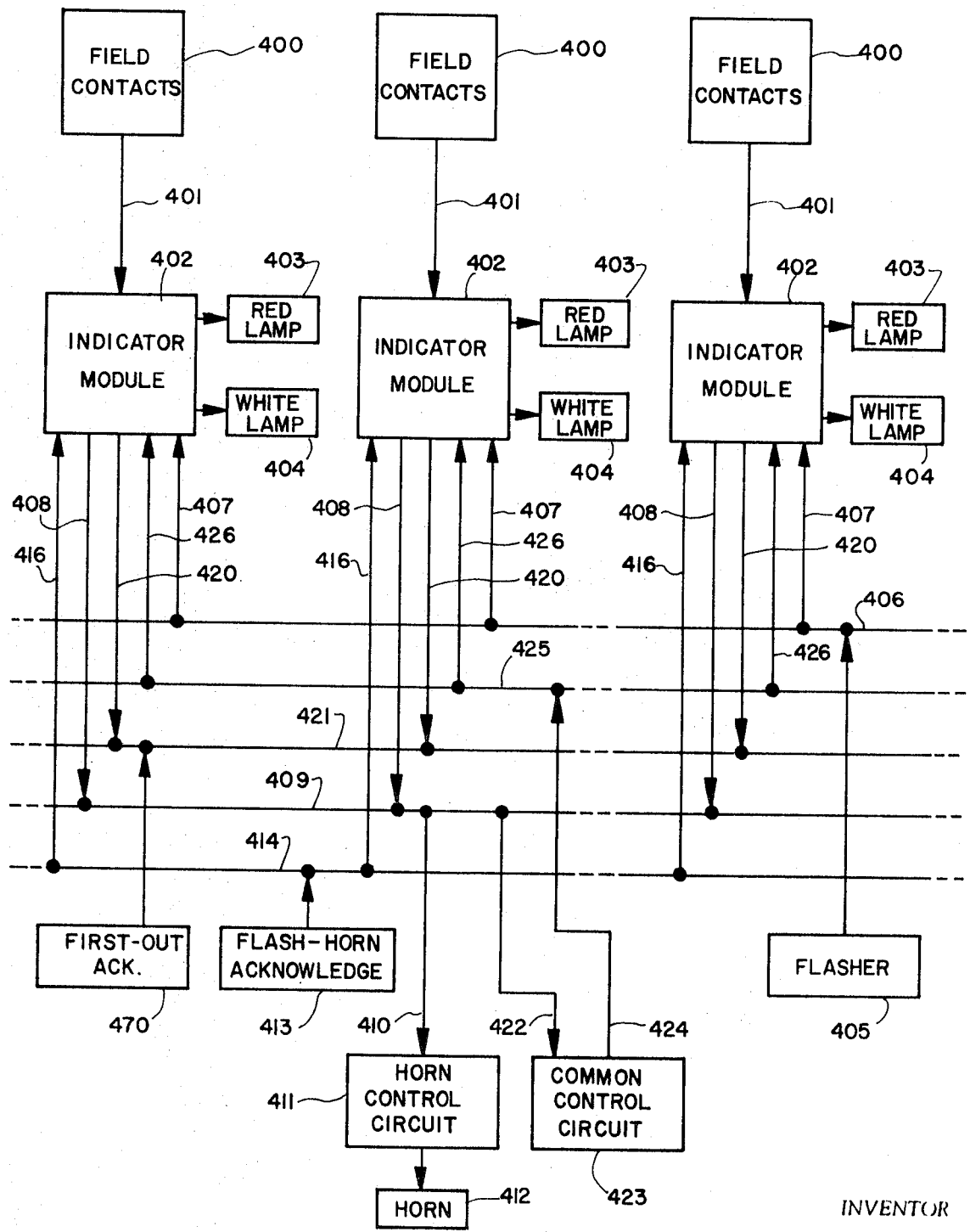
Figure 12:
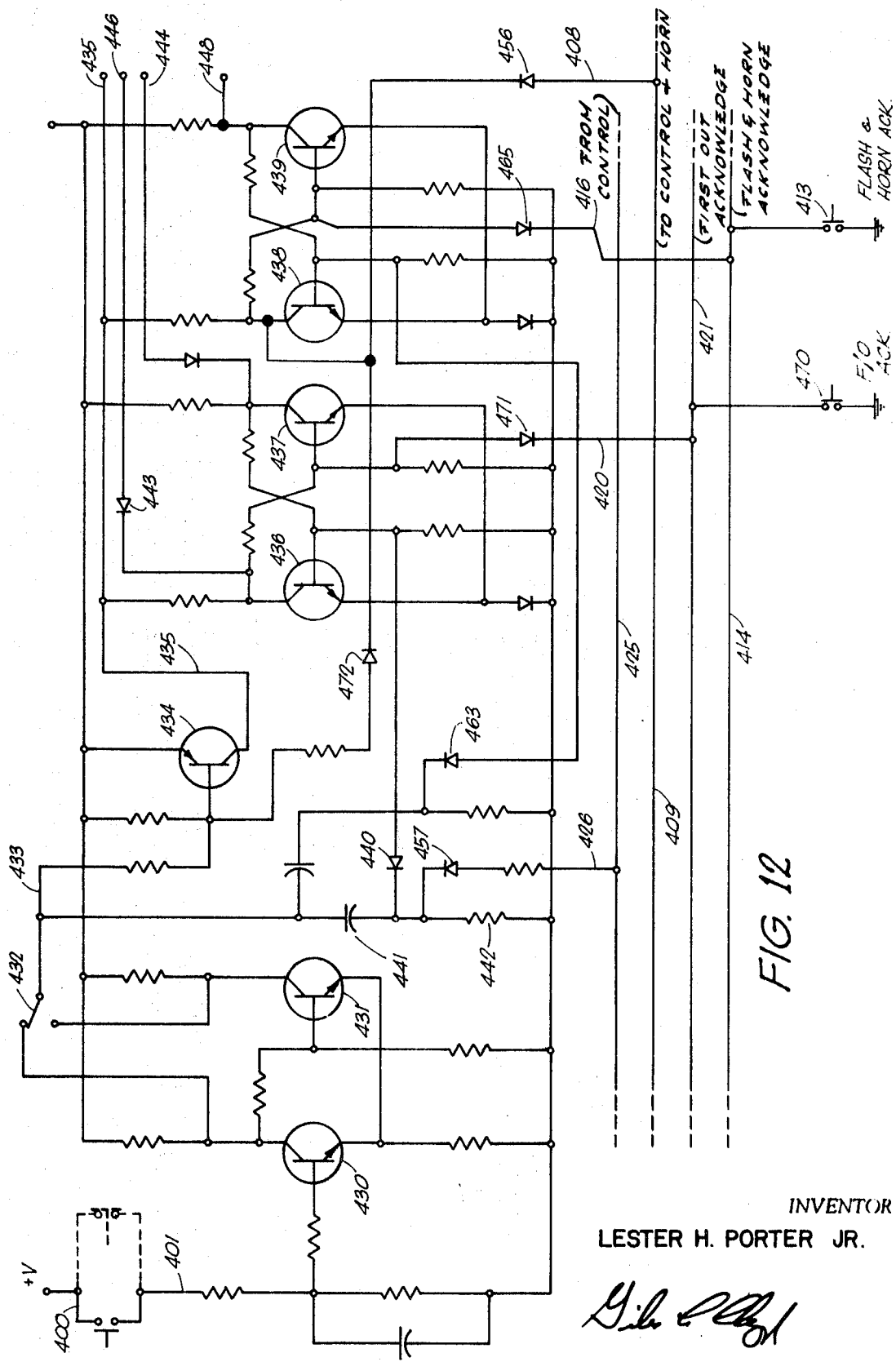

FIG. 4 is a detailed schematic diagram of the indicator module of the embodiment of the invention as in FIG. 3;

FIG. 5 is a block diagram of an annunciator system utilizing another embodiment of the indicator module of this invention, the annunciator system providing a sequence-type readout;

FIG. 6 is a detailed schematic diagram of a portion of the system of FIG. 5 showing the embodiment of the indicator module used in the system of FIG. 5;

FIG. 7 is a block diagram of an annunciator system using a different embodiment of the indicator module, this system producing different color lamp indications for first-out and subsequent-out modules;

FIGS. 8a—8c are detailed schematic diagrams of portions of the system of FIG. 7;

FIG. 9 is a block diagram of an annunciator system using still another embodiment of the indicator module of this invention, this system providing "ringback" operation;

FIG. 10 is a detailed schematic diagram of the indicator module used in the system of FIG. 9;

FIG. 11 is a block diagram of an annunciator system similar to that of FIG. 7 but representing another embodiment of the invention;

FIG. 12 is a schematic diagram of the indicator module used in the system of FIG. 11;

FIG. 13 is a schematic diagram of an indicator module for another embodiment of the invention;

FIGS. 14a and 14b are views of a switch device used in the circuit board for the module of FIG. 13;

FIG. 15 is a table giving the sequence for the annunciator system of FIGS. 1 and 2;

FIG. 16 is a table giving the sequence for the annunciator system of FIGS. 3 and 4;

FIG. 17 is a table giving the sequence for the annunciator system of FIGS. 5 and 6;

FIG. 18 is a table giving the sequence for the annunciator system of FIGS. 7 and 8;

FIG. 19 is a table giving the sequence for the annunciator system of FIGS. 9 and 10; and FIG. 20 is a table giving the sequence for the annunciator system of FIGS. 11 and 12.

With reference to FIG. 1, an annunciator system utilizing the indicator module of one embodiment of this invention is illustrated in block diagram form. In this system, a large number of detecting devices such as field contacts 10 are provided for the purpose of detecting the presence of selected abnormal conditions or malfunctions in a system which is being monitored. Typically, an annunciator system of this type is used to monitor operations such as in utility plants, chemical processing plants, pump stations and the like. Each of the field contacts 10 is a set of normally open or normally closed electrical contacts or switches located in the equipment being monitored. Ordinarily the conditions of interest would be items such as pressure, temperature, liquid level, motor speed, voltage or current level, fluid flow, etc. When such conditions are abnormally low or high, the field contacts 10 are individually actuated by opening or closing of the contacts. The field contacts 10 are remotely located in the equipment, and are all connected to the remainder of the annunciator system which would be located in a central control console. Thus, the field contacts 10 are connected by lines 11 to a plurality of identical indicator modules 12. In accordance with this invention, the indicator modules 12 provide the function of actuating a lamp 13 as well as an audible signal in a manner as will be explained in detail below. Each of the indicator modules 12 along with its associated lamp 13 is packaged in a self-contained plug-in unit, all of these units being mounted together in a suitable display panel. To actuate an audible alarm all of the indicator modules 12 are connected by output lines 14 to a horn bus line 15 which in turn is connected by a line 16 to a horn 17. This horn or similar audible signal is actuated whenever an abnormal condition switches any of the field contacts 10, while at the same time the lamp 13 associated with the module for the field contacts indicating an abnormal condi-

4 tion will be caused to come on flashing by means of a flashing circuit 18 which is connected by a line 19 to a bus line 20 and to an input 21 to all of the indicator modules. The alarm is turned off and the operation of the lamp is changed from flashing to continuous by actuating an acknowledge device 22 which is connected in common to all of the modules by a bus line 23 and inputs 24. After the acknowledge device 22, ordinarily a pushbutton, has been actuated by the operator the lamps 13 associated with field contacts which have indicated abnormal will remain on steady until the field contacts return to normal. When this occurs, the lamp will again flash and the audible alarm 17 will come on to alert the operator that the system is returned to a state with the lamps off and the alarm 17 off.

With reference to FIG. 2, a detailed schematic diagram of the circuit used in the embodiment of the invention in the system of FIG. 1 is illustrated. Generally, the circuit of FIG. 2 includes a Schmidt trigger having transistors 25 and 26 with provisions for switching between normally open and normally closed type field contacts 10, an amplifier or gate arrangement including a transistor 27, a lamp driving arrangement including transistors 28 and 29, and a bistable circuit including transistors 30 and 31. In the circuit of FIG. 2 the field contacts 10, which may be normally open as shown or normally closed as indicated in phantom, are connected in series with a positive voltage supply and a pair of resistors, with one of the resistors being shunted by a capacitor 32. This RC arrangement acts as a filter to remove noise and prevent spurious signals from affecting the system. The voltage across the capacitor 32 is applied through a resistor to the base of the NPN transistor 25 in a manner such that a malfunction causing closure of the contacts 10 will turn on the transistor 25, producing current flow in its load resistor 33 from a positive voltage supply line 34. The collector of the transistor 25 is connected through a resistor to the base of the NPN transistor 26 which likewise has a load resistor 35 connected to the supply line and shares a common emitter resistor with the transistor 25, these being returned to ground. The collector outputs from the transistors 25 and 26 will appear on lines 36 and 37 going to poles of a switch 38 which selects whether normally open or normally closed operation of the field contacts 10 is to be used. It will be noted that closing of the contacts 10 will result in turn-on of the transistor 25 and turnoff of the transistor 26, the latter being otherwise conductive. In the normally open mode of operation for the switch 10 as illustrated, the armature of the switch 38 will be in the upper position. The voltage on a line 39 connected to the switch armature will be high, virtually equal to the positive supply 34, until a malfunction occurs and then will be a low voltage, approaching ground potential. In like manner, in the normally closed mode of operation for the switch 10, the switch 38 will be in the lower position and the voltage on the line 39 will be high until a malfunction occurs and then, as the switch 10 opens, the transistor 25 will turn off causing the transistor 26 to turn on and a voltage on the line 37 and the line 39 to be reduced to a low voltage. Thus, at all points in the system past the switch 38 the conditions of operation of the system will be exactly the same whether operating in the normally open or normally closed mode.

The voltage on the line 39 will be at a high level for normal conditions and at a low level for abnormal conditions. This voltage is connected through a resistor to the base of the gate transistor 27. The PNP transistor will be normally nonconductive but when an abnormal condition occurs it will be rendered conductive since its base electrode will be driven to the low voltage of the line 39. When conductive the transistor 27 will apply the line voltage 34 to a line 40 which is coupled to the lamp driver and to the bistable circuit.

The lamp driver transistor 28 obtains emitter-collector bias from the line 40 and so can be conductive only when a high voltage appears on the line 40. When the transistor 28 conducts it supplies a positive base bias to the transistor 29, turning it on and actuating the lamp 13. The transistor 28 can conduct only when a voltage applied to its base is less than its emitter voltage. This base voltage is obtained from two different sources, one for a flashing signal and another for producing a steady actuation of the lamp 13. For flashing operation the base of the transistor 28 receives a square wave signal through a diode 41 which is connected by the line 21 to the flasher bus 20. This line 20 is connected by the line 19 to an output transistor 42 in the flasher circuit 18. The flasher circuit includes a free running multivibrator made up of a pair of transistors 43 and 44 along with associated load and bias resistors and cross coupling capacitors and diodes. This multivibrator will operate at a repetition rate of perhaps a few cycles per second to cause the lamp 13 to flash at a rate clearly visible to an observer. By this arrangement, when the line 40 initially switches to a high voltage, the voltage on the base of transistor 28 will follow the voltage on the emitter of the transistor 42 which switches between essentially V+ and ground, turning the transistor 28 on and off and flashing the light 13. To change from flashing to continuous operation of the lamp, the base of the transistor 28 is connected through a resistor to the collector of the transistor 30 in the bistable circuit.

In the bistable circuit, the collector of the transistor 31 is connected through a load resistor 45 to the V+ supply 34, while the collector of the transistor 30 is connected through a load resistor 46 to the line 40. Thus, initially, before a malfunction occurs, neither of the transistors 30 and 31 will be conductive because the transistor 30 will have no positive supply while the transistor 31 will not have sufficient base-emitter bias. Upon occurrence of an abnormal condition, the line 40 will go to a high voltage which will tend to turn on the transistor 30 since this transistor now has a positive supply voltage, but the transistor 30 will not turn on since its base will be low due to a negative pulse which will be applied to the base of the transistor 30 by a line 47. The line 47 is connected through a diode 48 to the juncture of a resistor 49 and a capacitor 50 which are connected in series between the line 39 and ground. When the line 39 steps to a low voltage upon occurrence of a malfunction, the capacitor 50, having charged to a positive voltage, will in effect apply a negative going pulse to the line 47 and the base of the transistor 30, insuring that it is initially turned off. The transistor 31 will turn on at this point since the collector voltage for the transistor 30 is high.

The collector voltage for the transistor 31, being low when a malfunction initially occurs, is connected through a diode 51 to the line 14, the bus line 15, and the line 16 to the actuating circuit for the horn 17. The horn driver merely consists of a PNP transistor 52 which is turned on when the collector voltage of the transistor 31 is low. Thus, when a malfunction occurs the lamp 13 will be turned on flashing and the horn 17 will be actuated. Due to a latching arrangement, this condition will continue until acknowledged by the operator. The latching arrangement in the circuit of FIG. 2 is provided by a line 53 and a resistor 54 which connect the collector of the transistor 31 to the base of the transistor 27. Once the transistor 31 turns on it will then provide a low voltage to the transistor 27 maintaining it conducting until such time as the transistor 31 is turned off. Thus, the bistable circuit is latched in this condition even though a malfunction no longer exists.

The state of the bistable circuit including the transistor 30 and 31 is switched, the horn is turned off, and the lamp 13 changes from flashing to continuous, when the operator presses an acknowledge switch 22 at the control console. The acknowledge switch 22 is connected through the bus line 21 and input 24 through a diode 55 to the base of the transistor 31. When the switch 22 is closed the base voltage on the transistor 31 is reduced to a value which turns off this transistor. The collector of the transistor 31 will thus go to a high voltage which will function to turn on the transistor 30. Conduction of the transistor 30 and cut off of the transistor 31 is of course a stable condition which will remain even after the acknowledge switch 22 is opened. The collector of the transistor 30 will now be at a low voltage and this voltage will be applied by a line 56 to the base of the transistor 28, holding this transistor on steady and holding the lamp 13 on steady. Since the collector voltage of the transistor 31 will now be high, the transistor 52 will not be turned on and the horn 17 will be silenced. Also it will be noted that high voltage on the collector of the transistor 31 will not latch on the transistor 27 through the line 53. Thus, after the acknowledge button 22 has been depressed, the transistor 27 will be maintained conductive only so long as the abnormal condition exists.

After the acknowledge button 22 has been depressed, if the switch 10 returns to normal, the voltage on the line 39 will return to a high value, thus causing the transistor 27 to tend to cut off. However, a positive pulse will be applied to the base of the transistor 31 through a diode 57 which is connected to the differentiating circuit 49, 50. This will momentarily turn on the transistor 31 and turn off the transistor 30 while at the same time a latching voltage will appear on the line 53 and the base of the transistor 27, holding the transistor 27 on. Also the operation of the lamp 13 will return to flashing and the horn 17 will be turned on since the collector voltage of the transistor 31 will be low. This condition will sustain until the acknowledge button 22 is again depressed, whereupon the horn 17 will silence and the lamp 13 will be turned off entirely. This is due to the fact that the closing of the acknowledge switch 22 will turn off the transistor 31 which will also turn off the transistor 27 and the transistor 30 will not come on. The circuit is now at its original state. This sequence of operation alerts the operator when the condition which is previously indicated abnormal has returned to a normal condition. On the other hand, if it remains abnormal, the lamp 13 will stay on.

In order to test the circuit, an abnormal condition may be simulated by means of a test switch 58 which is connected to the line 39 through a resistor and diode. A bus line 59, not shown in FIG. 1, also connects the test switch to all of the other indicator modules 12 in common. Closing of the test switch 58 reduces the voltage on the line 39 to approach ground potential just as occurrence of an abnormal condition of the switch 10 so that the remainder of the circuit may be tested.

In the system of FIGS. 1 and 2, occurrence of an abnormal condition at any of the contacts 10 will provide the same sequence of operations, i.e., flashing light and horn followed by steady light after acknowledge. Thus, there is no distinction between the first malfunction to occur and subsequent malfunctions. It is often desired to identify the first abnormal condition to occur since subsequent malfunctions may be merely the result of a chain reaction resulting from the first malfunction. Also, in most systems which include automatic shutdown equipment, a large number of abnormal indications will be the inevitable result of a malfunction at any point. Thus, it may be desired to avoid the necessity for pressing the acknowledge button after each malfunction indication. The system illustrated in FIGS. 3 and 4 provides this type of operation.

With reference to FIG. 3 there is shown an annunciator system utilizing a plurality of field contacts 60 each of which is connected by a line 61 to a separate indicator module 62. Each of the indicator modules 62 has associated therewith a lamp 63 which may be turned on in a flashing or steady mode. In addition, each of the modules 62 is connected by an output line 64 and a common bus line 65 and line 66 to a horn 67 which is, as explained below, will be energized when the first abnormal condition is detected. As before a flasher circuit 68 applies a square wave voltage to a bus line 69 which is connected by separate inputs to all of the modules 62 to produce flashing operation of the lamp 63 for the first malfunction indication. An acknowledge device 70, ordinarily a pushbutton, is connected to a bus line 71 common to all of the modules which in turn is individually connected to inputs to each of the modules. In order to change the indication given for malfunctions occurring after the first one, a control circuit 72 is provided which receives an input from a bus line 73 to which outputs from all of the modules 62 are connected. The control circuit 72 produces an output on a bus line 74 which likewise applies an input individually to each of the modules 62. When any one of the modules 62 detects a malfunction, it applies an input to the control circuit 72 which produces an output on the bus line 74 going to all of the remaining modules which are then switched to a condition such that they produce a steady actuation of the lamp 63, rather than flashing, but the horn is again actuated to alert the operator that another malfunction occurred. Finally, the system of FIG. 3 includes a reset device 75 connected in common to all the indicator modules by a bus line 76. Actuation of the reset device 75 by the operator returns the system to its original state.

Turning now to the detailed circuit diagram of FIG. 4, as above, the circuit of FIG. 4 basically consists of a Schmidt trigger circuit including a pair of NPN transistors 80 and 81, a gate arrangement including a PNP transistor 82, a lamp driving arrangement including a gate transistor 83 and a drive transistor 84, along with a bistable circuit arrangement including a pair of NPN transistors 85 and 86. The circuitry of the Schmidt trigger, the gate, and the bistable arrangement is of course modified as compared to the circuit of FIG. 2 in order to provide the different functions of this system.

In the circuit of FIG. 4, the field contacts 60, which may be normally open as shown or normally closed as indicated in phantom, are connected in series with a positive supply and a pair of resistors, one of the resistors being shunted by a filter capacitor 88 to remove noise. The voltage across the capacitor 88 is applied through a resistor to the base of the transistor 80 in a manner such that a malfunction causing closure of the contacts 60 will turn on the transistor 80, producing current flow in its load resistor 89 from a positive supply line 90. The collector of the transistor 80 in the Schmidt trigger is connected through a resistor to the base of the transistor 81 which likewise has a load resistor 91 connected to the supply line and shares a common emitter resistor with the transistor 80. The collector outputs from the transistors 80 and 81 are applied to poles of a switch 92 which selects whether normally open or normally closed operation of the field contact 60 is to be used. Closing of the contacts 60 will result in turn-on of the transistor 80 and turnoff of the transistor 81, the latter being otherwise conductive. In the normally open mode of operation for the switch 60 as illustrated, the armature of the switch 92 will be in the upper position. The voltage on a line 93 connected to the switch armature will be high, virtually equal to the positive supply 90, until a malfunction occurs and then will be a low voltage approaching ground potential. In like manner, in the normally closed mode of operation for the switch 60, the armature of the switch 92 will be in the lower position and the voltage on the line 93 will be high until a malfunction occurs and then, as the switch 60 opens, the transistor 80 will turn off causing the transistor 81 to turn on and the voltage on the line 93 to be reduced to a low voltage. Thus, as above, at all points in the circuit following the switch 92 the conditions of operations will be exactly the same whether in the normally open or normally closed mode.

The voltage on the line 93 will thus be at a high level for the normal condition, before a malfunction occurs, and at a low level for the abnormal condition. This voltage is connected through a resistor to the base of the gate transistor 82 so that this transistor will be normally nonconductive but will be rendered conductive when an abnormal condition occurs since its base electrode will be driven to the low voltage of the line 93. When conductive the transistor 82 will apply the line voltage 90 to a line 94 which is coupled to the lamp driver, to the bistable circuit, and to a latching arrangement.

For driving the lamp 63 the gate transistor 83 obtains emitter-collector bias from the line 94 and so can be conductive only when a high voltage appears on the line 94. Conductance of the transistor 83 supplies a positive base bias to the transistor 84, turning it on and actuating the lamp 63. The transistor 83 can conduct only when a voltage more negative than that on the line 94 is applied to its base. This negative voltage is obtained from two different sources, one for flashing and another for steady actuation of the lamp 63. For flashing operation, the base of the transistor 83 receives a square wave signal through a diode 95 which is connected to the bus line 69 and thus to the flasher circuit 69. As above the flasher circuit 68 includes a free running multivibrator consisting of a pair of NPN transistors 96 and 97 along with an output transistor 98. This multivibrator will operate at a repetition rate of a few cycles per second to cause the lamp 63 to flash. To override the voltage applied to the base of the transistor 83 from the flasher circuit and cause continuous actuation of the lamp 63, the base of this transistor is also connected to the collector of the transistor 85 in the bistable circuit.

In the bistable circuit, the collector of the transistor 86 is connected through a load resistor 99 to the V+ supply 90, while the collector of the transistor 85 is connected through a load resistor 100 to the line 94. Thus, before a malfunction occurs, neither of the transistor 85 and 86 will be conductive since the transistor 85 will have no positive collector supply while the transistor 86 will have no base-emitter bias. Upon occurrence of an abnormal condition, the line 94 will step up to a high voltage which will turn on the transistor 86 since a positive voltage will be applied to its base through the resistor 100. The transistor 85 will not turn on due to a negative pulse which will appear on a line 101 connected to its base. The line 101 is connected through a diode 102 to a differentiating circuit made up of a resistor 103 and a capacitor 104. This differentiating circuit is connected between the line 93 and the ground so that when the line 93 steps down to a low voltage upon occurrence of a malfunction, the capacitor 104, having charged to a positive voltage, will in effect apply a negative pulse to the line 101 and the base of the transistor 85, insuring that it is initially turned off.

The negative step voltage on the line 93 occurring when a malfunction is detected, is connected through a diode 105 to the horn bus line 65 and thus by the line 66 to the circuit for controlling the horn 67. The horn control circuit includes a bistable arrangement comprising a pair of NPN transistors 106 and 107. The horn 67 is connected across the output of a driver transistor 108 which conducts to actuate the horn whenever the transistor 107 in the bistable circuit is conductive. Initially, the transistor 106 conducts and the transistor 107 is turned off but when a malfunction occurs and the line 93 steps down, the base voltage of the transistor 106 is reduced to a low level, turning off this transistor which turns on the transistor 107 and actuates the horn. The horn may be silenced by depressing a pushbutton switch 109 which connects the base of the transistor 107 to ground through a diode 110 and thus turns off the transistor 107. It will be noted that if the operator presses the horn silence switch 109, the horn is turned off but the lamp 63 continues to flash for this module since the state of the bistable circuit including transistors 85 and 86 is not switched. The horn may also be silenced, and operation of the lamp 63 changed from flashing to continuous, by depressing an acknowledge switch 70 which grounds the bus line 71 and due to the diode 111 connecting this bus line to the base of the transistor 86, turns off the transistor 86 and turns on the transistor 85. The bus line 71 may also be connected to the base of the transistor 107 in the bistable circuit for the horn driver by means of a diode 112, assuring that the horn driver bistable circuit will switch and deactivate the horn. Of course, depressing the acknowledge switch 70 causes the lamp 63 to come on continuously due to the connection from the collector of the transistor 85 by a line 113 to the base of the transistor 83, overriding the square wave applied to this base from the flasher circuit. This mode of operation is ordinarily not preferred since the first module to indicate abnormal would not then be identified by a flashing light rather than continuous. For this reason the operator would ordinarily acknowledge by pressing the horn silence button 109 rather than the acknowledge button 70.

The latching function for the circuit of FIG. 4 is provided by feeding back the voltage on the line 94 through resistors 114 and a diode 115 to a switch 116. In the normally open mode, the armature of the switch 116 applies the positive voltage from the line 94 to the base of the transistor 80, holding this transistor on after the contacts 60 close even though these contacts may subsequently open. In the normally closed mode, the armature of the switch 16 is in the lower position and applies this positive voltage to the base of the transistor 81, holding this transistor on for the same purpose. For this latching operation, the voltage on the line 94 is used to charge the capacitor 117. To provide a reset function it will be noted that this capacitor may be discharged, and the voltages on either the base of the transistor 80 or the base of the transistor 81 lowered, through a path including a diode 118 going to the reset bus line 76 which in turn is connected to ground when the reset pushbutton 75 is closed. Depressing the reset button turns off the transistor 80, or the transistor 81, steps up the voltage on the line 94, thus turning off the lamp 63 in all of the modules 62, if all of the contacts have returned to normal.

The control circuit 72 functions to prevent the lamp 63 from flashing for any of the modules 62 detecting a malfunction after the first malfunction occurs. To this end, a transistor 120 in the control circuit is turned on by a low voltage applied to its base from the bus line 73 which is connected through a diode 121 to the collector of the transistor 86. The transistor 120 will be turned on when the transistor 86 in the first module 62 to detect an abnormal condition turns on. So long as the transistor 120 conducts, it will apply a positive voltage from its collector to the bus line 74 which in turn is connected through a diode 122 to the differentiating circuit including the resistor 103 and capacitor 104. The positive voltage produced on the line 74 from the transistor 120 will prevent the capacitor 104 from charging in modules 62 other than the one first to detect a malfunction. This will prevent a negative pulse from being applied to the bases of transistors 85 in such subsequent modules and thus will cause the transistor 85 in such subsequent modules to come on initially instead of the transistor 86. This will cause the lamp 63 in which subsequent modules to come on continuous instead of flashing, although the horn will be actuated.

In operation of the system of FIGS. 3 and 4, if all of the field contacts 60 detect normal conditions all of the lamps 63 will be off and the horn 67 will be off. When the first abnormal condition occurs, the lamp 63 in the module 62 which detected this first malfunction will be turned on flashing since the transistor 86 in this module will be conductive. The horn 67 will be actuated due to a negative going pulse coupled through the diode 105 to the bus line 65 to turn on the transistor 106 in the bistable circuit for the horn. This negative going pulse is of course derived across the differentiating circuit including the resistor 123 and capacitor 124 connected between the line 93 and ground. This negative going pulse turns off the transistor 106, turns on the transistor 107 and actuates the horn 67. The circuit will remain in this condition, the lamp flashing and the horn on, until the horn silence switch 109 is depressed by the operator, at which time the horn will turn off but the lamp 63 associated with the first module to detect malfunction will continue to flash. Subsequent modules detecting abnormal conditions will turn on the lamp 63 associated with these modules.

Referring now to FIG. 5, it will be noted that the indicator module according to this invention may be used in an annunciator of the type described and claimed in copending application, Ser. No. 588,817, filed Oct. 24, 1966 by George J. Ehni, III for Annunciator System with Sequence Indication, assigned to the assignee of the present invention. This system includes means for counting the number of modules at which malfunctions are detected and storing the count in memories associated with each module to produce upon demand a visual readout of the order or sequence in which the modules detected malfunctions. To this end, the system of FIG. 5 just as in the system described above, utilizes a plurality of field contacts 130 each of which is connected by a line 131 to a separate indicator module 132. Each indicator module 132 has associated therewith a lamp 133 which may be turned on in a flashing or steady mode. In addition, each of the modules 132 is connected by an output line 134 to a horn bus line 135 which in turn is connected by a line 136 to an actuating circuit for a horn 137. A flasher circuit 138 applies a square wave voltage to a bus line 139 which is connected by separate inputs to all of the modules 132 to produce flashing operation of the lamp 133 for the module which first detects a malfunction. An acknowledge pushbutton 140 is connected to a bus line 141 which applies inputs to all of the modules 132. A reset pushbutton 142 applies a reset voltage by a bus line 143 to all of the modules to return the system to its original state.

Upon the occurrence of a malfunction detected by any one of the modules 132, an output pulse is produced in the module and is applied to a bus line 145 by means of an output line 146 from the modules. These pulses are counted and used for the function of recording the sequence in which the malfunctions occurred as will be subsequently explained. Each of the modules 132 when activated also produces an enabling voltage which is applied to one of a plurality of like memory circuits 147 by lines 148. A separate memory circuit 147 is associated with each of the modules 132, and each of these memory circuits functions to store a numerical indication of the sequence in which the malfunction occurred for its corresponding module 132. This numerical indication is derived by means of a counter 150 which receives the negative pulses from the line 145 by a line 151 and a gate and delay circuit 152 which will be explained below, and output of the circuit 152 being applied to the counter 150 by a line 153. The pulses registered in the counter 150 produce a binary output which appears on three output lines 154 which are connected to a set of three bus line 155 for connection individually to each of the memory circuits 147. The memory circuits 147 are enabled by means of a pulse input applied to an input 156 to each of the memories, this pulse occurring after a short delay following each of the count pulses appearing on the line 145. This delayed set pulse is generated within the gate and delay circuit 152 and applied by a line 157 and a bus line 158 to all of the memory inputs 156. The purpose of this delay of the set pulse is to permit the counter 150 to operate before attempting to enter a number into any of the memory circuits. When a given one of the modules 132 indicates a malfunction, it produces a count pulse on the line 145 which then increases the number registered in the counter 150 by one, while at the same time such module produces an enabling voltage on the output 148 to its associated memory 147 so that as soon as the set pulse appears on the input 156 of this memory the numerical indication appearing on the lines 155 will be read into and stored in this memory 147. After a number has been entered into one of the memories 147, it is latched to prevent subsequent numbers appearing on the lines 155 from being entered. Subsequent malfunctions in other modules 132 will increase the number registered in the counter 150 by one and cause the memory 147 associated with each such module to accept and store the number then produced at the counter output on lines 155.

The modules 132 and their associated lamps 133 are all arranged on a suitable display panel, not shown. Upon the occurrence of a malfunction in the first several of the modules, their lamps will be turned on, initially flashing, clearly visible to the operator at the panel. In order to determine the sequence in which the malfunctions occurred, the operator depresses one of a plurality of pushbuttons each of which is associated with a particular one of the memory circuits 147. This causes the numerical indications stored in the selected memory to be read out on output lines 160 which are applied to the memory bus lines 161. The bus lines are connected to the inputs of a decoder 162 which drives a display unit 163 so that the number stored in the memory 147 for which the readout button is depressed will appear on the visual display 163, this number indicating the sequence of occurrence of the malfunction for this particular module.

The monitor or operator would ordinarily be interested in identifying the sequence of only the first several malfunctions which occur since the remaining ones will usually be merely part of a chain reaction caused by the first to occur. Accordingly, the system is simplified considerably without loss of any operating advantage by providing for indication of only the first several malfunctions. To this end, the counter 150 registers only up to the first small number of malfunctions, seven for example, and thereafter the numerical sequence will not be entered into the memories 147 for subsequent malfunctions detected at the modules 132. To provide this function, the gate and delay circuit 152 includes means for disenabling the memory circuits 147 after the selected number of malfunctions has occurred. The gate and delay circuit 152 receives the counter output from the lines 154, and functions to produce a lockout signal at a line 165 which is applied through a lockout amplifier 166 to a lockout bus line 167 from which inputs 168 are applied to each of the modules 132. After the selected small number of malfunctions have occurred, the modules 132 indicating subsequent malfunctions will be prevented from applying enabling voltages on their outputs 148 to the memories. Thus, no further number will be entered into the memory circuits 147, although the number already entered will remain for selective readout on the display 163. The lights 133, however, associated with these subsequent malfunctions will be energized, although these lamps will come on steady rather than flashing.

With reference to FIG. 6 a detailed schematic diagram of one of the indicator or first-out modules 132 is illustrated. The remainder of the system of FIG. 5 will not be described in detail herein as it is explained in said copending application. The circuit of FIG. 6 is generally similar to that of FIGS. 2 and 4 above in that the field contacts 130 are connected to the input of a Schmidt trigger including transistors 170 and 171, the outputs of which are connected to poles of a switch 172 which selects between normally open and normally closed modes. The armature of this switch is connected to a line 173 which will be at a high voltage until a malfunction occurs and at a low voltage after malfunction. This line is connected to a gate transistor 174 which functions to apply the voltage on the supply line 175 to a line 176 when malfunction occurs. The line 176 is connected to a lamp driving circuit including transistors 177 and 178 just as in the previous embodiment. The flasher multivibrator 138 has its output connected through the bus line 139 to the base of the transistor 177 to apply a square wave voltage thereto to produce flashing of the lamp 133 as previously explained. The line 176 is also connected to a bistable circuit which includes a pair of transistor 180 and 181. The occurrence of a malfunction produces a negative going step on the line 173 which is coupled through a differentiating circuit including a capacitor 182 and a resistor 183. From this differentiating circuit is coupled a negative pulse through a diode 184 to the base of the transistor 180 insuring that this transistor is cut off when a malfunction occurs. The transistor 181 will be initially turned on thus causing the lamp 133 to flash as previously explained. To maintain the bistable circuit in this condition even though the abnormal condition may cease, a latching arrangement is provided which includes resistors 185 and a diode 188 connected from the line 176 back to a switch 189. The contacts of the switch 189 are connected to the bases of the transistors 170 and 171 to produce the same latching operation as in FIG. 4.

The negative step produced at the line 173 is also used to produce the count pulse. This line is coupled to a differentiating circuit 186 which in turn is coupled through a diode to the line 146 going to the counter, providing the negative pulses to operate the counting circuit. The differentiating circuit made up of the capacitor 182 and resistor 183 also is used in the lockout function. A positive voltage applied through a diode 187 to this capacitor 182 when the lockout function is desired prevents the capacitor from charging and thus prevents it from coupling a negative pulse back to the base of the transistor 180 when malfunction occurs. This causes the transistor 180 to come on initially instead of the transistor 181, thus preventing the lamp 133 from flashing and preventing the horn from being actuated.

The horn 137 is actuated in the same manner as that explained with reference to FIG. 4. The horn driver circuit includes a pair of transistors 190 and 191 connected to form a bistable circuit, along with an output transistor 192. The horn 137 will be actuated when the transistor 191 in the bistable circuit is conductive and will remain actuated until the transistor 191 is cut off either by means of a horn silence switch 193 which shorts the base of the transistor 191 to ground and cuts it off, or by means of grounding the base of the transistor 191 from the acknowledge bus line 141 through a diode 194. The bistable circuit for the horn is switched from off to on by the same negative pulses which drive the counter, these being coupled from the differentiator 186 through the diode to the horn bus line 135 and from the bus line to the base of the transistor 190 through a resistor 195.

The acknowledge function is provided by the pushbutton 140 which connects the bus line 141 to ground, the line 141 being connected through a diode 196 to the base of the transistor 180. Thus when the acknowledge button is pressed the transistor 181 will be turned off and the transistor 180 turned on, causing the lamp to stop flashing and, as explained above, the horn to silence due to the connection through the diode 194. The reset function is provided by the switch 142 which when depressed connects the bus line 143 to ground, the line 143 being connected through a diode 197 to lower the voltage on the line 176, thus permitting the circuit to resume its original state.

It will thus be noted that the circuit of FIG. 6 is essentially the same as that of FIG. 4 except that provision is made for producing negative pulses to operate the counter, and the lockout function is provided which is similar to the control circuit function of FIG. 4.

The indicator module illustrated in the several preceeding embodiments may be further modified to provide an annunciator system which identified the first-out station with a visual alarm of a different color from subsequent out stations. For example, the first-out indication may be a flashing red lamp and subsequent ones may be flashing white lamps. After acknowledge or reset, the indications may remain the same color, red or white as the case may be, but change from flashing to steady. Also by acknowledge or reset the original first-out indication may be retained after acknowledge while the stations indicating a malfunction after acknowledge can be distinguished from the others, that is by a flashing light. The system may be latching or nonlatching as described. A system providing these operating characteristics will now be described with reference to FIGS. 7 and 8.

Referring now to FIG. 7, a block diagram of an annunciator system providing the operating features just described is illustrated. As set forth above, each station will have associated therewith field contacts 200 each of which is connected by a line 201 to a separate indicator module 202. Each of the indicator modules 202 may be a circuit as illustrated in detail in FIGS. 8a and 8b as explained below. Associated with each of the indicator modules 202 is a red lamp 203 and a white lamp 204, each of which may be turned on either in a flashing or steady mode. A square wave signal for producing the flashing mode of operation is provided from a flasher circuit 205, exactly like the flasher circuit 18 of FIG. 2, which applies the square wave voltage to a bus line 206 and thus by an input 207 to each of the indicator modules 202. When one of the indicator modules 202 detects a malfunction at its associated field contacts 200, a negative going pulse appears on an output 208 and thus to a bus line 209. The line 209 is connected by an input 210 to a horn control circuit 211, the output of which actuates an audible alarm such as a horn 212. When the first malfunction occurs in any of the modules 202, a negative going pulse will appear on input 210 causing the horn 212 to be energized continuously until an acknowledge device 213 is operated. The acknowledge switch 213 is connected to a bus line 214 from which an input 215 is applied to the horn control circuit 211 to deenergize the horn. Also, an input 216 is applied from the line 214 to each of the indicator modules 202 to operate the bistable circuit which changes the lamps from flashing to steady and also functions to store the original first-out information. To reset all of the modules to their original condition, a reset switch 217 is provided which is connected by a bus line 218 and inputs 219 to each of the indicator modules 202. To provide the desired first-out mode of operation, all of the indicator modules 202 are connected by outputs 220 and a bus line 221 to an input 222 of a common control circuit 223. The circuit 223 is exactly like the circuit 72 including the transistor 120 in FIG. 4. An output 224 from this circuit is applied by a bus line 225 and inputs 226 to all of the indicator modules 202 to produce the first-out function.

In the annunciator system for FIG. 7, when the first set of field contacts 200 goes abnormal its associated indicator module 202 will cause the red lamp 203 for this module to come on flashing, a square wave signal to produce the flashing operation being provided from the flasher circuit 205. At the same time an output pulse will be produced on the output 208 from the first-out indicator modules which will cause the horn control circuit 211 to actuate the horn 212. The horn will remain actuated until acknowledged. Meanwhile the first-out module will produce an output on the line 220 which actuates the common control circuit 223 to apply a potential to the bus line 225 and thus to the remaining modules to put such modules in a state whereby if succeeding modules detect abnormal conditions the white lamps 204 will come on flashing for these modules instead of the red lamp. Accordingly, prior to acknowledge, the first-out station will be indicated by a flashing red lamp. Thereafter, if the acknowledge switch 213 is depressed by the operator, the horn 212 will be turned off and a voltage applied to the inputs 216 of all the indicator modules to cause the square wave input to be overriden and the lamps 203 and 204 to be held on steady. It is understood that the original first-out information is retained since the first-out module will be indicated by a steady red light while the succeeding out modules will be indicated by a steady white lamp. Of course all modules not detecting abnormal conditions will be dark. Now, when the next indicator module 202 detects an abnormal condition, the sequence will be repeated in that the lamps will come on flashing, the horn will again be actuated, and then when the acknowledge button is again depressed the indications will change from flashing to steady but the first-out information will be retained. The circuitry of the indicator modules may be such that the system is latching on first-out, latching before acknowledge, etc., as desired.

With reference now to FIGS. 8a—8c, circuitry for implementing the system of FIG. 7 will be described in detail. FIGS. 8a and 8b together include the circuitry in one of the indicator modules 202, while FIG. 8c includes the horn control circuit 211. With reference to FIG. 8a, it is noted that the field contacts 200, either normally open or normally closed, are connected by the line 201 to a Schmidt trigger circuit including a pair of transistors 230 and 231, with the outputs of these transistors being connected to the poles of a switch 232 which selects between normally open and normally closed operation. Just as in FIG. 4, the Schmidt trigger circuitry causes the voltage on the line 233 on the output of the switch to be positive, approaching V+ potential, until a malfunction occurs at which time the potential on the line 233 steps down to almost ground. This tends to turn on a gate transistor 234, the collector of which is connected to align 235 so that the line 235 will be positive, at about V+ potential, when a malfunction has been detected or will be at a low voltage under normal conditions. Connected to the line 235 are two bistable flip-flop circuits, the first including a pair of transistors 236 and 237 and the second including a pair of transistors 238 and 239, these bistable circuits being generally similar in construction and operation to the bistable circuit including the transistors 85 and 86 in FIG. 4. When the indicator module has not detected a malfunction, that is in normal steady state conditions, none of the transistors 236—239 will be conductive. When an abnormal condition occurs at the field contacts 200 of a first indicator module, the voltage on line 233 will go in a negative direction producing a negative going pulse through a diode 240 from a differentiator circuit including a capacitor 241 and resistor 242 to the base of transistor 236. Simultaneously, the voltage on line 235 goes positive, applying voltage to the collector of transistors 236 and 237. Thus, transistor 237 will turn on first since transistor 236 is held off by the negative going pulse on its base. In the other bistable circuit including the transistors 238 and 239, the transistor 238 will come on first when the line 235 goes positive since transistor 239 will be held off by a negative going pulse on its base provided by line 208 from the second differentiating circuit. The two bistable circuits are connected to the lamp gating circuitry of FIG. 8b and connected to the common control circuit 223 to provide the desired sequence of operation.

The collector of the transistor 236 is connected through a diode 243 and a line 246 to the base of a transistor 245 in the gating circuitry for the white lamp 204 as seen in FIG. 8b. In like manner the collector of the transistor 237 is connected through a diode and a line 244 to the base of a transistor 247 in the gating circuitry for the red lamp 203. The line 235 from the output of the gating transistor 234 is connected to the emitters of these two transistors 245 and 247 providing the emitter potential so that neither can be conductive until the positive potential is applied to this line 235. The collector of the transistor 239 is connected by a line 248 and serial diodes and resistors to bases of transistors 250 and 251 in the lamp gating circuitry of FIG. 8b. When the transistors 247 and 250 are both conductive, a lamp drive transistor 252 will be turned on and the red lamp 203 energized. In like manner when the transistors 245 and 251 are turned on, a lamp drive transistor 253 will be conductive and the white lamp 204 energized. Of course, when the line 235 first goes positive the transistor 238 will be conductive and the transistor 239 turned off in the second bistable circuit so the voltage on the line 248 will be high and thus cannot cause the transistors 250 and 251 to turn on. Instead, a square wave flashing voltage appearing on the line 206, switching alternately between V+ and ground, coupled through the diodes 254 and 255 to the bases of the transistors 250 and 251, alternately turns these transistors on and off so that the red or white light will flash at a visual rate if one of the transistors 245 and 247 is conductive. When the acknowledge switch 213 is depressed the line 214 and input line 216 will be grounded, the transistor 238 turned off and the transistor 239 turned on, lowering the voltage on the line 248 and overriding the flashing signal to turn the transistors 250 and 251 on steady. Only one of the transistors 245 and 247 can be rendered conductive, depending upon whether the transistor 236 or the transistor 237 in the first bistable circuit is conductive. This will depend upon whether a given module 202 is the first-out or a subsequent out because the transistor 237 in the first module to detect an abnormal condition will when rendered conductive cause the output line 220 and the bus line 221 to be brought down virtually to ground potential by conduction through the diode 256. Thus, the input 222 for the common control circuit 223 will go to a low voltage and its output 224 will go to virtually V+ potential, this voltage being applied by the bus line 225 and the input line 226 through the diode 257 to the differentiating circuit. This charges the capacitor 241 in all of the modules so that in subsequent modules a negative going step on the line 233 will not reach the base of the transistor 236, thus the transistor 237 will turn on first in any module detecting a malfunction after the first-out. In such modules the line 246 will be held at a low potential since the transistor 237 is conductive and so the transistor 245 will be held on, permitting the white light 204 to be actuated. In these modules the transistor 247 will be held off since the voltage on line 244 will be high, thus the red light 203 cannot be turned on.

With reference to FIG. 8c, the horn control circuit 211 comprises a bistable circuit including transistors 260 and 261. When the transistor 261 is conductive a lamp drive transistor 262 will conduct, energizing the horn 212. When the first one of the modules 202 detects a malfunction and a negative going step appears on the line 233, a negative pulse will be coupled through an RC differentiating circuit and a diode 263 to the bus line 209 from which an input 210 to the base of the transistor 260 causes the transistor 260 to turn off and the transistor 261 to turn on, sounding the horn. When the acknowledge switch 213 is depressed the base of the transistor 261 is grounded through the bus line 214 thus turning off the horn. Also when the line 214 is grounded the transistor 238 in all of the modules are turned off by conduction through the input line 216 and diode 265. This of course turns on the transistor 239 and lowers the voltage on the line 248 changing any lights that are actuated from flashing to steady operation.

The circuit of FIG. 8a—8c latches on red until reset due to the action of a diode 266 connected between the base of the transistor 234 and the collector of the transistor 237, causing the transistor 234 to be held on even though the first-out field contacts return to normal. The circuit is reset by a positive voltage applied through a diode 267 from the line 219 to the base of the transistor 234, cutting off this transistor and returning all modules to their original state. A capacitor 268 connected between the line 235 and ground acts as a filter to avoid switching states due to transients, etc.

For monitor and control of some systems, it is desirable to provide an indication and alarm not only when a part of the system goes abnormal, but also when it returns to normal. The overall system would be continuing to operate, and so the alarm for a back-to-normal indication should be different from that of an abnormal indication since other points of the system may be going abnormal. The indicator module which has been discussed above in various embodiments may be used to provide this type of operation, referred to as "ringback," in an annunciator system. The ringback system is illustrated in FIGS. 9 and 10 which will now be discussed in detail.

Referring now to FIG. 9, a block diagram of an annunciator system providing ringback operation is illustrated. As in the previous embodiments, each station will have field contacts 300 which are connected to separate indicator modules 302, each indicator module including a visual indicator in the form of a lamp 303. The lamps may be energized in three different ways, referred to as slow-flash, fast-flash, and steady. A square waveform for producing the slow-flash is produced by a flash circuit 304, exactly like the flasher circuit 18 discussed above, with the output of this circuit being applied by a bus line 305 to all of the indicator modules by inputs 306. A square waveform for producing the fast-flash is provided by a flash circuit 307. The circuit 307 merely comprises a one shot multivibrator which receives an input from the bus line 305 and produces an output on a line 308 having the same frequency as that on the line 305 but having a shorter duty cycle. This waveform is applied by bus waveform 309 to all of the indicator modules by inputs 310. When the flast-flash waveform is operating the lamp 303 in one of the indicator modules, the lamp will flash or blink at a noticeably different manner than when the slow-flash circuit 304 is controlling. In addition to the different types of lamp indications provided by the system of FIG. 9, also two different types of horn indications are used. When one of the indicator modules 302 detects an abnormal condition at the field contacts, an output pulse is produced on a bus line 311 through outputs 312. The bus line 311 is connected to the input of a first horn control circuit 313, the output of which actuates a horn 314 having a first distinct tone. Thus, the first abnormal condition to occur causes the horn 314 to be actuated, and this continues until an acknowledge switch 315 is depressed, grounding a bus line 316. The line 316 is connected to all of the indicator modules by an input 317 so that upon acknowledge the horn 314 will be silenced and, as before, the actuation of the lamps switched from flashing to steady. Meanwhile, if the field contacts 300 associated with the module which detected malfunction returns to normal, an output pulse applied from each of the modules by an output 318 to a bus line 319 is applied to a second horn control circuit 320 which actuates a horn 321 having a different distinct tone. Thus, the horn 321 will be actuated whenever field contacts return to normal from an abnormal condition. Also at this time the lamp 303 will come on flashing fast or blinking instead of the original "slow" flashing rate. The circuitry for implementing this operating sequence will be discussed with reference to FIG. 10.

In FIG. 10 a schematic diagram for one of the indicator modules 302 is shown in detail. As in the previous circuits the field contacts 300 are connected to a Schmidt trigger circuit including a pair of transistors 325 and 326, the outputs of which are connected to a switch 327, providing a voltage on a line 328 which is at the V+ level when the field contacts are normal and is at virtually ground potential when the field contacts 300 are abnormal. The voltage on the line 328 is applied to the base of a first gating transistor 329 so that the latter transistor is turned on when an abnormal condition occurs. The collector output of the transistor 329 is connected by a line 330 to the emitter of a second gate transistor 331 and also through a load resistor to the collector of one transistor 332 in a bistable circuit including a pair of transistors 332 and 333. The collector of the gate transistor 331 and the collector of the transistor 332 in the bistable circuit provide emitter and base inputs to a gating transistor 334 for actuating a lamp drive transistor and the lamp 303. Another input to the base of the lamp gate 334 is derived through a diode and input 306 from the bus line 305 upon which the slow flash waveform appears. In the bistable circuit, neither transistor will be on until an abnormal condition occurs, at which time a voltage supplied on the line 330 will tend to cause the transistor 332 to come on first unless a negative pulse is applied to its base through a diode 335. The negative pulse is of course derived from a differentiating circuit connected between the line 328 and ground as before. Another differentiating circuit connected between the line 328 and ground produces a negative going pulse applied through a diode 336 to the output 312 and the bus line 311 going to the first horn control circuit 313. Thus the negative going step appearing on the line 328 when a malfunction occurs serves to hold off the transistor 332 and also applies a negative pulse to the input of the first horn control to cause energization of the horn 314. When the field contacts return to normal, the line 328 goes positive, this step also being differentiated to apply a positive pulse through a diode 337 and output line 318, bus line 319, to the input of the second horn control circuit 320, causing the horn 321 to be actuated upon return to normal condition. Also a positive pulse will be applied through a diode 338 to the base of the transistor 333, turning on this transistor and turning off the transistor 332.

To turn on the lamp 303, the transistor 334 must be conductive, and for this to be true the transistor 331 must be conductive. The transistor 331 conducts when the voltage on line 330 is high and when its base voltage is low. A low voltage is applied to the base of the transistor 331 through a diode 339 whenever the line 328 is at a low potential, that is when the field contacts are at abnormal condition. Also applied to the base of the transistor 331 is the fast flash waveform consisting of negative going pulses having a short duty cycle, this being applied through a diode 340 going to the input 310 which receives the fast flash waveform from the circuitry 307. Of course these negative pulses will have no effect on the transistor 331 so long as the voltage on the line 328 is low, that is so long as the abnormal condition is sustained, but when the voltage is high on line 328 the fast flash waveform will cause the transistor 331 to be switched on intermittently and thus switch the transistor 334 and the lamp 303 on and off in the same manner. The transistor 329 is latched on upon occurrence of an abnormal condition by current flow through a resistor 341 going from its base to the collector of the transistor 333. Upon the first abnormal, the transistor 333 will of course be turned on and will stay on until its base is grounded by acknowledge. Also after pressing the acknowledge button, turning off the transistor 333 and turning on the transistor 332, return of the field contacts to normal will turn the transistor 333 back on by a positive pulse applied from the differentiator through the diode 338.

In operation, upon occurrence of the first abnormal condition the voltage on the line 328 goes low, the transistor 329 turns on, turning on the transistor 331 and causing the transistor 333 in the bistable circuit to turn on. Conduction of the transistor 331 provides bias to the emitter of the lamp gate transistor 334 and so the slow flash waveform applied to its base will cause the lamp to flash at the normal rate. A negative pulse coupled to the line 312 through the diode 336 will turn on the first horn 314. If the acknowledge switch 315 is pressed at this point, the bistable circuit switch, turning on the transistor 332 and turning off the transistor 333. The lamp gate transistor 334 will now be held on steady due to the connection of its base to the collector of the transistor 332, and so the lamp will be on steady, while the first horn will be turned off. If the field contacts for this module go back to normal, the voltage on the line 328 rises back to V+ and the bistable circuit will reset, turning off transistor 332 and turning on transistor 333 due to a positive pulse through the diode 338. This latches on the transistor 329 due to the connection through the resistor 341. In this condition the transistor 331 would be off except for the negative pulses applied to its base through the diode 340, this being the fast flash waveform. Thus, the lamp 303 blinks or flashes with a short duty cycle. At the same time a positive pulse is coupled from the differentiator through the diode 337 to the bus line 319 and to the second horn control circuit, turning on the horn 321. This condition sustains until the acknowledge switch 315 is again depressed, at which time the turn off of the transistor 333 returns the circuit to its original state. Each of the horn control circuits 313 and 320, in a manner similar to the horn control circuits of FIGS. 4 and 6, is returned to its original state upon acknowledge.

An additional embodiment of the invention will now be described wherein the indicator module is used in an annunciator system which retains first-out information after acknowledge and permits a new first-out sequence. The first-out module is distinguished from subsequent outs by different colored lights, while acknowledged and nonacknowledged modules are distinguished by flashing or steady lamps. Thus the system is very similar to that of FIGS. 7—8, but includes additional functions as will be explained.

Referring now to FIG. 11, a block diagram of an annunciator system quite similar to that of FIG. 7 but providing the different operating features as just described is illustrated. As in the previous embodiments, each station will have associated therewith field contacts 400 each of which is connected by a line 401 to a separate indicator module 402. Each of the indicator modules 402 may be a circuit as illustrated in detail in FIG. 12 which is explained below. Associated with each of the indicator modules 402 is a red lamp 403 and a white lamp 404, each of which may be turned on either in a flashing or steady mode. A square wavesignal for producing the flashing mode of operation is provided from a flasher circuit 405, exactly like the flasher circuit 18 of FIG. 2, which applies the square wave voltage to a bus line 406 and thus by an input 407 to each of the indicator modules 402. When one of the indicator modules 402 detects a malfunction at its associated field contacts 400, a negative going voltage, rather than a negative pulse as before, appears on an output 408 and thus to a bus line 409. The line 409 is connected by an input 410 to a horn control circuit 411, the output of which actuates an audible alarm such as a horn 412. The horn control circuit 411 in this embodiment is merely an amplifier stage rather than a bistable circuit 211 as in FIG. 8c. When the first malfunction occurs in any of the modules 402, a low (or negative going) voltage will appear on input 410 causing the horn 412 to be energized continuously until a "flasher and horn" acknowledge device 413 is operated which switches the voltage on the line 408 to a high or positive value as explained below. The acknowledge switch 413 is connected to a bus line 414 from which an input 416 is applied to each of the indicator modules 402 to operate a bistable circuit which changes the lamps from flashing to steady. Also, the low voltage appearing on the line 408 is used to provide the desired first-out mode of operation, all of the indicator modules 402 being connected by outputs 408 and the bus line 409 to an input 422 of a common control circuit 423. The circuit 423 is exactly like the circuit 72 including the transistor 120 in FIG. 4. An output 424 from this circuit is applied by a bus line 425 and inputs 426 to all of the indicator modules 402 to produce the first-out function.

In the annunciator system of FIG. 11, when the first set of field contacts 400 goes abnormal the associated indicator module 402 will cause the red lamp 403 for this module to come on flashing, a square wavesignal to produce the flashing operation being provided from the flasher circuit 405. At the same time a low output voltage will be produced on the output 408 from the first-out indicator module which will cause the horn control circuit 411 to actuate the horn 412. The horn will remain actuated until acknowledged. Meanwhile the output on the line 408 actuates the common control circuit 423 to apply a potential to the bus line 425 and thus to the remaining modules to put such modules in a state whereby if succeeding modules detect abnormal conditions the white lamp 404 will come on flashing for these modules instead of the red lamp. Accordingly, prior to operating the acknowledge switch 413, the first-out station will be indicated by a flashing red lamp and all succeeding abnormal stations will be indicated by a flashing white lamp. Thereafter, if the acknowledge switch 413 is depressed by the operator, the horn 412 will be turned off and a voltage applied to the inputs 416 of the indicator modules to turn on transistor 438 and cause the square wave input to be overridden and the lamps 203 or 204 to be held on steady. It is understood that the original first-out information is retained since the first-out module will be indicated by a steady red light while the succeeding out modules will be indicated by a steady white lamp. Of course all modules not detecting abnormal conditions will be dark. Now, when the next indicator module 402 detects an abnormal condition, the sequence will be repeated in that the next first-out will come on red-flashing, the horn will again be actuated, the succeeding outs will come on white-flashing, and then when the acknowledge button is again depressed the indications will change from flashing to steady but the first-out information will be retained providing a series of sets of indications, each including a first-out red. To remove the red so that the next first-out can be recognized, a first-out acknowledge switch 470 is also provided. The circuitry of the indicator modules is such that the system is latching before acknowledge, and nonlatching after acknowledge.

With reference now to FIG. 12, a circuitry for implementing the system of FIG. 11 will be described in detail. It is noted that the field contacts 400 are connected by the line 401 to a Schmidt trigger circuit including a pair of transistors 430 and 431, with the outputs of these transistors being connected to the poles of a switch 432 which selects between normally open and normally closed operation. Just as in FIG. 4, the Schmidt trigger circuitry causes the voltage on the line 433 on the output of the switch to be positive, approaching V+ potential, until a malfunction occurs at which time the potential on the line 433 steps down to almost ground. This tends to turn on a gate transistor 434, the collector of which is connected to a line 435 so that the line 435 will be positive, at about V+ potential, when a malfunction has been detected or will be at a low voltage under normal conditions. Connected to the line 435 are two bistable flip-flop circuits, the first including a pair of transistors 436 and 437 and the second including a pair of transistors 438 and 439, these bistable circuits being generally similar in construction and operation to the bistable circuit including the transistors 85 and 86 in FIG. 4. When the indicator module has not detected a malfunction, that is in normal steady state conditions, none of the transistors 436—439 will be conductive. When an abnormal condition occurs at the field contacts 400 of a first indicator module, the voltage on line 433 will go in a negative direction producing a negative going pulse through diode 440 from a differentiator circuit including a capacitor 441 and resistor 442 to the base of transistor 436. Simultaneously, the voltage on line 435 goes positive, applying voltage to the collectors of transistors 436 and 437. Thus, transistor 437 will turn on first since transistor 436 is held off by the negative going pulse on its base. In the other bistable circuit including the transistors 438 and 439, the transistor 438 will come on first when the line 435 goes positive because a negative pulse is applied to the base of the transistor 439 through the diode 463 from another differentiating circuit across the line 433. The two bistable circuits are connected to lamp gating circuitry which is exactly like that of FIG. 8b, and connected to a common control circuit 223 just like the circuit of FIG. 7 to provide the desired sequence of operation.

The collector of the transistor 436 is connected through a diode 443 and a line 446 to the base of a transistor 245 in the gating circuitry for the white lamp as seen in FIG. 8b. In like manner the collector of the transistor 437 is connected through a diode and a line 444 to the base of transistor 247 in the gating circuitry for the red lamp as seen in FIG. 8b. The line 435 from the output of the gating transistor 434 is connected to the emitters of the two transistors 245 and 247 in the gating circuitry as described above. The lamps 203 and 204 correspond to lamps 403 and 404 in FIG. 11. Neither red lamps 403 or white lamps 404 can come on unless the line 435 is at near V+. The collector of the transistor 439 is connected by a line 448 to the bases of transistors 250 and 251 in the lamp gating circuitry of FIG. 8b as above. Thus, when the transistor 438 is off the lamps come on flashing, or when the transistor 439 is on the lamps will be on steady. Of course, when the line 435 first goes positive the transistor 438 will be conductive and the transistor 439 turned off in the second bistable circuit so the voltage on the line 448 will be high and thus cannot cause the transistors 250 and 251 (in FIG. 8b) to turn on. Instead, a square wave flashing voltage appearing on the line 406, switching alternately between V+ and ground, coupled to the bases of the transistors in the lamp drive circuitry causes the red or white light to flash at a visual rate. When the "flash and horn" acknowledge switch 413 is depressed the line 414 and input line 416 will be grounded, the transistor 438 turned off and the transistor 439 turned on, lowering the voltage on the line 448 and overriding the flashing signal to cause the lamp to come on steady. Either the red or white lamp will be on steady depending upon whether the transistor 437 or the transistor 436, respectively, in the first bistable circuit is conductive. This will depend upon whether a given module 402 is the first-out or a subsequent out because the transistor 438 in the first module to detect an abnormal condition will, when rendered conductive, cause the output line 408 and the bus line 409 to be brought down virtually to ground potential by conduction through the diode 456. Thus, the input 422 for the common control circuit 423 will go to a low voltage and its output 424 will go to virtually V+ potential, this voltage being applied by the bus line 425 and the input line 426 through the diode 457 to the differentiating circuit. This charges the capacitor 441 in all of the modules so that in subsequent modules a negative going step on the line 433 will not reach the base of the transistor 436, thus the transistor 436 will turn on first in any module detecting a malfunction after the first-out. In such modules the white light will be actuated instead of the red light.

The horn control circuit 411 comprises a one stage transistor driver circuit, the output of which actuates an alarm relay to energize the horn 412. When the first one of the modules 402 detects a malfunction and a low voltage appears on the line 408, and lines 409 and 410, causing sounding of the horn 412. When the acknowledge switch 413 is depressed the base of the transistor 438 is grounded through the bus line 414 thus turning off the transistor 438 and turning off the horn. Also when the line 414 is grounded the transistors 438 in all of the modules are turned off, this of course turning on the transistor 439 and lowering the voltage on line 448, changing any lights that are actuated from flashing to steady operation.

An alternative acknowledge function is provided by a first-out-acknowledge switch 470 which is connected by a bus line 421 to inputs 420 to all of the modules. In each module the input 420 is connected through a diode 471 to the base of the transistor 437. Thus, in the first-out module where the transistor 437 is conductive and the red light is on, pushing the switch 470 will turn off the transistor 437 and turn on the transistor 436, changing the lamp indication from red to white. The board can thus be cleared of the red lights so that the next first-out will be apparent.

The utility of the function provided by the F-0 acknowledge 470 will be understood when it is appreciated that the original first-out information is retained after acknowledge with the switch 413 but yet the succeeding first-out module will also come on red-flashing followed by white-flashing for subsequent outs until the switch 413 is again pressed. Thus, after a series of sets of malfunctions occur, there will be a number of red lights on, and so these may be cleared with the switch 470.

The systems of FIGS. 11 and 12 latches by conduction through a diode 472 which is connected from the base of the transistor 434 to the collector of the transistor 438. This will be a latch-before-acknowledge and nonlatching-after-acknowledge function since after acknowledge the transistor 438 will not be conductive and so the transistor 434 would not be held on. The system latches on either red or white, and on either first-out or subsequent out.

The sequences of operation for each of the annunciator systems described above are illustrated in tabular form in the FIGS. 15—20.

The versatility of the basic building block of the indicator circuitry of this invention may perhaps best be illustrated by reference to the embodiment of FIG. 13, which is noted to be very similar to the circuit of FIG. 2 or FIG. 4. A circuit board would be manufactured containing lead patterns and terminals for components to include all of the circuitry of FIG. 13, and further including a number of unique switches which may be used to connect the circuit to perform any one of a variety of different sequences. The circuit board would include connectors and terminals to provide an input 480 from the field contacts, a Schmidt trigger including transistors 481 and 482, a gate transistor 483, transistors 484 and 485 for the bistable circuit, along with lamp gate and driver transistors 486 and 487. Connectors and terminals for all of the resistors, diodes and capacitors as illustrated would likewise be included. In addition, the circuit board would include seven switchlike terminals 491—497 which are used to select the sequence. Each of these structures, being of the form illustrated in FIGS. 14a and 14b, may be opened or closed by the customer, or prior to delivery to the customer, to produce the desired sequence, it being noted that it is necessary to produce only one type of circuit board with one particular pattern rather than a large number of different patterns, or rather than using permanent solder type connections to produce the different sequences. The switch 491, for example, produces a latching-before-acknowledge function if it is in the closed position since it holds the transistor 483 on so long as the transistor 485 is conducting, then when the transistor 485 is cut off by acknowledge the latching current will no longer prevail. Likewise, the switch 492 produces a ringback type function since if closed this would permit a positive pulse to be applied to the base of the transistor 485 when the field contacts return to normal, thus turning on this transistor and, if the switch 491 is also closed, causing it to be latched on. Switches 493 and 495 provide a selection of normally open or normally closed field contacts just as the switch 38 of FIG. 2, it being understood that only one of these switches 493 and 495 would be closed. Likewise, the switches 494 and 496 provide an alternative latching function for either normally open or normally closed field contacts, this arrangement functioning exactly like the switch 116 in FIG. 4. This function is latching both before and after acknowledge and thus required a reset. The switch 497 is in series with the conductor which apply the control voltage for the first-out function to the differentiating circuit so that this function may be included or not as an alternative.

Each of the switches 491—497 is of the form illustrated in FIGS. 14a and 14b wherein it is seen in the plan view that conductors 498 and 499 may be shorted together or open depending upon whether a large-headed screw 500 is in the top or the bottom part of the circuit board. A nut 501 having a threaded bore is provided in the circuit board to hold the screw in either position.

Another feature illustrated in the circuit of FIG. 13, although it could be utilized in the indicator circuitry of any of the embodiments, is the use of a pushbutton switch 504 in series with the power supply for the lamps 505. Even though the lamp drive transistor 487 may be rendered conductive, no current will flow through the lamps 505 unless the switch 504 is depressed. This arrangement would be useful in situations where the annunciator system or indicator module is located remotely and seldom visited by an operator. Here it would be useless to permit the lamps 505 to burn continuously following a malfunction, and so the supply voltage may be applied to the lamps only when the operator visits the site. This is accomplished by depressing the pushbutton switch 504. Although shown in FIG. 13, the lamps and pushbutton switch would not be a part of the circuit board but instead would be located separately in the cabinet for the annunciator system. Also it may be noted that only one pushbutton switch 504 would be necessary for the entire system, rather than one for each module.

While the indicator modules of this invention have been described with reference to specific embodiments, it is understood of course that this description is not to be construed in a limiting sense. Various modifications of the disclosed embodiments, as well as other embodiments of the invention, will be apparent to those skilled in the art upon reference to this application. It is therefore contemplated that the appended claims will cover any such modifications or embodiments as fall within the true scope of the invention.

I claim:

1. An indicator module for an annunciator system selectively operable in one of a plurality of operating modes, comprising:
    an input from a point to be monitored connected to said module for supplying a point input signal signifying a change in the condition of said point;
    a visual indicator means;
    a modular circuit means connected between said point input and said visual indicator means for energizing said visual indicator means in response to said point input signal,
    said modular circuit means including a plurality of normally uncoupled current path means, selected ones of said current path means being operative to provide a selected one of a plurality of operating modes; and
    selector means for each of said current path means mounted on said modular circuit means coupling its associated current path means between said point input and said visual indicator means to provide a selected one of said operating modes.

2. The indicator module of claim 1 further including circuit board means for supporting said current path means and wherein each of said selector means comprises a threaded female member secured to said circuit board adjacent an input and an output portion of an associated current path means and a correspondingly threaded male member in said female member for coupling said input and output portions when said male member is in a first position and to uncouple said associated current path means when said male member is in a second position.

3. The indicator module of claim 1 wherein said modular circuit means includes:
    a trigger circuit means selectively responsive to a normally closed point contact signal and to a normally open point contact signal for producing a first trigger output signal in the absence of a point contact input signal and a second trigger output signal in the presence of a point contact input signal;
    a first gating means for producing a first gate output signal in response to the first trigger output signal and a second gate output signal in response to the second trigger output signal;
    a first of said normally uncoupled current path means comprising first and second mutually exclusive trigger output path means connected from the trigger circuit means to the first gating means, one of said trigger output path means being coupled by its associated selector means for supplying the first and second trigger output signals to the gating means;
    a bistable circuit means for producing a first bistable output signal in response to the first gate output signal and for producing a second bistable output signal in response to the second gate output signal;
    a second gating means for producing a third gate output signal in response to the first bistable output signal and for producing a fourth gate output signal in response to the second bistable output signal; and
    a driving circuit means for preventing energization of said visual indicator means in response to the third gate output signal and for energizing the visual indicator means in response to the fourth gate output signal.

4. The indicator module of claim 3 wherein selected ones of said normally uncoupled current path means are coupled and connected to means for rendering the indicator module operable in a single-indication occurrence-ringback operating mode, including:
    a flasher-input circuit connected from a flasher-input terminal to the second gating means;
    a flasher means connected in common to the flasher-input terminals of a plurality of the indicator modules for applying a pulsating voltage to the terminal of the module receiving a first to occur point input signal to provide a flashing visual indication thereof;
    a first of said normally uncoupled current path means coupled by an associated selector means and connected from the bistable circuit means to the first gating means for applying a latching current thereto to maintain the flashing visual indication following removal of the point input signal;
    a horn-output circuit connected from the bistable circuit means to a horn-output terminal;
    horn means connected in common to the horn-output terminals of a plurality of the indicator modules operable in response to the first to occur point input signal to produce an audible indication thereof;
    an acknowledge-input circuit connected from an acknowledge-input terminal to the bistable circuit means; and
    a manually operable acknowledge switch connected in common to the acknowledge-input terminals of a plurality of the indicator modules for applying an acknowledge signal to the bistable circuit means to change the flashing visual indication to a continuous visual indication in the presence of a point input signal and to remove the flashing visual indication in the absence of a point input signal and to remove the audible indication.

5. The indicator module of claim 3 wherein selected ones of said normally uncoupled current path means are coupled and connected to means for rendering the indicator module operable in a first-out operating mode, including:
    a flasher-input circuit connected from a flasher-input terminal to the second gating means;
    a flasher means connected in common to the flasher-input terminals of a plurality of the indicator modules for applying a pulsating voltage to the terminals of the module receiving a first to occur point input signal to provide a flashing visual indication thereof;

a second of said normally uncoupled current path means comprising first and second mutually exclusive first gate output signal path means connected from the first gating means to the trigger circuit means, one of said first gate output signal path means being coupled by an associated selector means for applying a latching current to the trigger circuit means to maintain the flashing visual indication following removal of the point input signal;

an acknowledge-input circuit connected from an acknowledge-input terminal to the bistable circuit means;

a manually operable acknowledge switch connected in common to the acknowledge-input terminals of a plurality of the indicator modules for applying an acknowledge signal to the bistable circuit means to change the flashing visual indication to a continuous visual indication in the presence of a point input signal and to remove the flashing visual indication in the absence of a point input signal and to remove the audible indication;

a horn-output circuit connected from the bistable circuit means to a horn-output terminal;

a horn-control output circuit connected from the trigger circuit means to a horn control terminal;

horn control means including a horn means and a manually operable horn silence switch connected in common to the horn control terminals and to the acknowledge-input terminals of a plurality of the indicator modules operable in response to the first to occur point input signal to produce an audible indication thereof;

a third of said normally uncoupled current path means coupled by an associated selector means and connected from the trigger circuit means to a control terminal;

a control means connection in common to the control terminals and horn-output terminals of a plurality of the indicator modules for applying a control signal to prevent application of the pulsating voltage to the flasher-input terminals of all the modules except the one receiving the first to occur point input signal;

a reset-input circuit connected from a reset-input terminal to the bistable circuit means; and a manually operable reset switch connected in common to the reset-input terminals of a plurality of the indicator modules for removing the latching current to the trigger circuit means to remove the visual indication.

6. The indicator module of claim 5 including additional means for rendering the indicator module operable in a sequence memory operating mode, including:

a memory-output circuit connected from an input to the bistable circuit means from the first gating means to a memory output terminal; and a memory means including display means connected in common to the memory-output terminals, control terminals, and horn control terminals of a plurality of the indicator modules for recording and, upon demand, displaying the sequence of serial occurrences of the point input signals to the plurality of indicator modules.

7. The indicator module of claim 4 wherein additional ones of said normally uncoupled current path means are coupled and connected to means for rendering the indicator module operable in a double-indication occurrence-ringback operating mode, including:

a third gating means connected from the first gating means to the second gating means;

a second-flasher input circuit connected from a second-flasher input terminal to the third gating means;

a second flasher means connected in common to the second-flasher input terminals of a plurality of the indicator modules for producing a second visual indication different from said flashing visual indication in response to the removal of a point input signal;

a third of said normally uncoupled current path means coupled by an associated selector means and connected from the trigger circuit means to a control terminal;

a horn control output circuit connected from the trigger circuit means to a horn control terminal;

a first horn control means including said horn means connected in common to the control terminals of a plurality of the indicator modules for producing a first audible indication in response to a first occurrence of a point input signal; and a second horn control means including a second horn means connected in common to the horn control terminals of a plurality of the indicator modules for producing a second audible indication different from the first audible indication in response to the removal of the point input signal.

8. The indicator module of claim 3 wherein selected ones of said normally uncoupled current path means are coupled and connected to means for rendering the indicator module operable in a maintained first-out operating mode, wherein:

said bistable circuit means includes first and second bistable circuit means;

said second gating means includes first and second bistable circuit means;

said second gating means includes third and fourth gating means, said third and fourth gating means each including first and second gating circuits;

said driving circuit means includes first and second driving circuit means;

said visual indicator means includes first and second visual indicator means; and further including:

a flasher-input circuit connected from a flasher-input terminal to the first and second gating circuits of the third gating means;

a flasher means connected in common to the flasher-input terminals of a plurality of the indicator modules for applying a pulsating voltage to the flasher-input terminal of the module receiving a first to occur point input signal to provide a flashing visual indication thereof on the first visual indicator means;

a first of said normally uncoupled current path means coupled by an associated selector means and connected from the first bistable circuit means to the first gating means for applying a latching current thereto to maintain the flashing visual indication following removal of the point input signal;

a second of said normally uncoupled current path means coupled by an associated selector means and connected from the trigger circuit means to a first control terminal;

a control circuit connected from the first bistable circuit means to a second control terminal;

a first-out control circuit means connected in common to the first and second control terminals of a plurality of the indicator modules for applying the pulsating voltage from the flasher means to the modules receiving point input signals subsequent to the first to occur point input signal to provide a second flashing visual indication on the second visual indicator means;

a horn control output circuit connected from the trigger circuit means to a horn control terminal;

a horn control-acknowledge input circuit connected from a horn control-acknowledge input terminal to the second bistable circuit means;

a horn-control means including a horn means connected in common to the horn control-acknowledge terminals and to the horn control terminals of a plurality of the indicator modules operable in response to the first to occur point input signal to produce an audible indication thereof;

a manually operable acknowledge switch connected in common to the horn control-acknowledge terminals of a plurality of the indicator modules and to the horn-control means for changing the flashing visual indications to continuous visual indications in the presence of point input signals and to remove the second flashing visual indications in the absence of point input signals, and to remove the audible indication;

a reset-input circuit connected from a reset-input terminal to the first bistable circuit means; and a manually operable reset switch connected in common to the reset-input terminals of a plurality of the indicator modules for removing the visual indications.

9. The indicator module of claim 3 wherein selected ones of said normally uncoupled current path means are coupled and connected to means for rendering the indicator module operable in a first-out acknowledge operating mode, wherein:
said bistable circuit means includes first and second bistable circuit means;
said second gating means includes third and fourth gating means, said third and fourth gating means each including first and second gating circuits;
said driving circuit means includes first and second driving circuit means;
said visual indicator means includes first and second visual indicator means;
and further including:
a flasher-input circuit connected from a flasher-input terminal to the first and second gating circuits of the third gating means;
a flasher means connected in common to the flasher-input terminals of a plurality of the indicator modules for applying a pulsating voltage to the flasher-input terminal of the module receiving a first to occur point input signal to provide a flashing visual indication thereof on the first visual indicator means;
a first of said normally uncoupled current path means coupled by an associated selector means and connected from the first bistable circuit means to the first gating means for applying a latching current thereto to maintain the flashing visual indication following removal of the point input signal;
a second of said normally uncoupled current path means coupled by an associated selector means and connected from the trigger circuit means to a control output terminal;
a control-horn circuit means connected from the second bistable circuit means to a control-horn output terminal;
a first-out control circuit means connected in common to the control input terminals and to the control-horn output terminals of a plurality of the indicator modules for applying the pulsating voltage from the flasher means to the modules receiving point input signals subsequent to the first to occur point input signal to provide a second flashing visual indication on the second visual indicator means;
a horn control means including a horn means connected in common to the control-horn terminals of a plurality of the indicator modules operable in response to the first to occur point input signal to provide an audible indication thereof;
a flasher-horn acknowledge circuit connected from a flasher-horn acknowledge input terminal to the second bistable circuit means;
a manually operable flasher-horn acknowledge switch connected in common to the flasher-horn acknowledge input terminals of a plurality of the indicator modules for changing the flashing visual indications to continuous visual indications in the presence of point input signals and to remove the visual indications in the absence of point input signals, and to remove the audible indication;
a first-out acknowledge circuit connected from a first-out acknowledge input terminal to the first bistable circuit means; and
a manually operable first-out acknowledge switch connected in common to the first-out acknowledge input terminals of a plurality of the indicator modules for changing the continuous visual indications on the first visual indicators to continuous visual indications on the second visual indicators.